US 8,465,294 B2

(12) United States Patent
May et al.

(10) Patent No.: US 8,465,294 B2
(45) Date of Patent: *Jun. 18, 2013

(54) HEART COMPRESSION SIMULATION DEVICE

(76) Inventors: Daniel C. May, Oro Valley, AZ (US);
Larry Bramlett, Marana, AZ (US)

(\*) Notice: Subject to any disclaimer, the term of this patent is extended or adjusted under 35 U.S.C. 154(b) by 216 days.

This patent is subject to a terminal disclaimer.

(21) Appl. No.: 13/012,429

(22) Filed: Jan. 24, 2011

(65) Prior Publication Data

US 2011/0165546 A1 Jul. 7, 2011

Related U.S. Application Data

(63) Continuation-in-part of application No. 12/753,539, filed on Apr. 2, 2010, now Pat. No. 8,323,030.

(60) Provisional application No. 61/166,656, filed on Apr. 3, 2009.

(51) Int. Cl.
*G09B 23/28* (2006.01)

(52) U.S. Cl.
USPC ........................................... 434/267

(58) Field of Classification Search
USPC .............. 434/262, 265, 267, 268, 272, 275, 434/276
See application file for complete search history.

(56) References Cited

U.S. PATENT DOCUMENTS

| 4,454,391 A | 6/1984 | Olsson |
| 4,984,987 A | 1/1991 | Brault et al. |
| 5,195,896 A | 3/1993 | Sweeney et al. |
| 5,249,968 A | 10/1993 | Brault et al. |
| 5,286,206 A | 2/1994 | Epstein et al. |
| 5,312,259 A | 5/1994 | Flynn |
| 5,383,786 A | 1/1995 | Køhnke |
| 5,417,143 A | 5/1995 | Pasek |
| 5,423,685 A | 6/1995 | Adamson et al. |
| 5,468,151 A | 11/1995 | Egelandsdal et al. |
| 5,540,592 A | 7/1996 | Scheinberg et al. |
| 5,580,255 A | 12/1996 | Flynn |

(Continued)

FOREIGN PATENT DOCUMENTS

| WO | 01/80284 A2 | 10/2001 |
| WO | 02/03905 A2 | 1/2002 |

(Continued)

OTHER PUBLICATIONS

WWW.CPR-SUPPLIES.COM; Little Anne™ Manikin; internet; as of Jan. 18, 2011.

(Continued)

*Primary Examiner* — Kurt Fernstrom

(57) ABSTRACT

A heart compression simulation device featuring a base; a resistance means disposed on the base; and an actuator operatively connected to the resistance means. The actuator can move between at least a starting position wherein the actuator is positioned at a starting position above the base and an end position wherein the actuator is pushed down near or contacting the base. The actuator is biased in the starting position caused by the resistance means. A tear effect providing mechanism provides resistance when moving the actuator from the starting position to the end position a first time. A lock-out mechanism is adapted to disengage the tear effect providing mechanism after the actuator has been moved from the starting position to the end position such that subsequent movements of the actuator between the starting position and the end position are not hindered by the tear effect providing mechanism.

29 Claims, 36 Drawing Sheets

U.S. PATENT DOCUMENTS

| | | | |
|---|---|---|---|
| 5,628,633 | A | 5/1997 | Lehman |
| 5,885,084 | A | 3/1999 | Pastrick et al. |
| 6,007,342 | A | 12/1999 | Tjølsen |
| 6,227,864 | B1 | 5/2001 | Egelandsdal et al. |
| 6,500,009 | B1 | 12/2002 | Brault et al. |
| 6,530,783 | B1 | 3/2003 | McGinnis |
| 6,736,643 | B2 | 5/2004 | Pastrick et al. |
| 7,316,568 | B2 | 1/2008 | Gordon et al. |
| 7,857,625 | B2 | 12/2010 | Gomo |
| 8,241,042 | B2 | 8/2012 | Rosenthal et al. |
| 2001/0012609 | A1 | 8/2001 | Pastrick et al. |
| 2005/0058977 | A1 | 3/2005 | Cantrell et al. |
| 2006/0019229 | A1 | 1/2006 | Morallee et al. |
| 2007/0054254 | A1 | 3/2007 | Cook et al. |
| 2007/0264621 | A1 | 11/2007 | Nysaether et al. |
| 2009/0293977 | A1 | 12/2009 | Lauterbach |
| 2010/0021876 | A1 | 1/2010 | Clash |

FOREIGN PATENT DOCUMENTS

| | | | |
|---|---|---|---|
| WO | 2005-094176 | A2 | 10/2005 |
| WO | 2007/093944 | A2 | 8/2007 |
| WO | 2010131143 | A1 | 11/2010 |

OTHER PUBLICATIONS

WWW.CPR-SUPPLIES.COM; CParlene® CPR Manikins; internet; as of Jan. 18, 2011.

WWW.CPR-SAVERS.COM; Prestan CPR Training Manikins; internet; as of Jan. 18, 2011.

WWW.CPR-SUPPLIES.COM; Ambu CPR Manikins and CPR Training Manikins; internet; as of Jan. 18, 2011.

WWW.CPR-SUPPLIES.COM; CPR Prompt Manikins, CPR Supplies; internet; as of Jan. 18, 2011.

WWW.CPR-SUPPLIES.COM; Basic Buddy™ Single CPR Manikin; internet; as of Jan. 18, 2011.

WWW.CPR-SUPPLIES.COM; Adult Sani-Manikin; internet; as of Jan. 18, 2011.

WWW.ARMSTRONGMEDICAL.COM; Actar D-fib® CPR/AED Manikin; internet; as of Jan. 18, 2011.

WWW.ARMSTRONGMEDICAL.COM; CPR / Adult-Manikins-CPR and Training—Armstrong Medical; internet; as of Jan. 18, 2011.

Fig. 9A
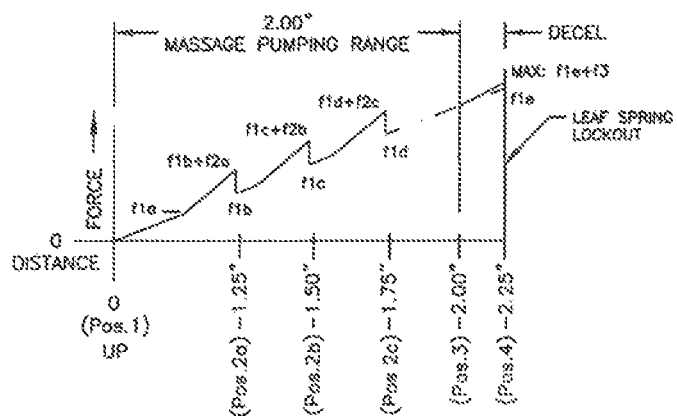
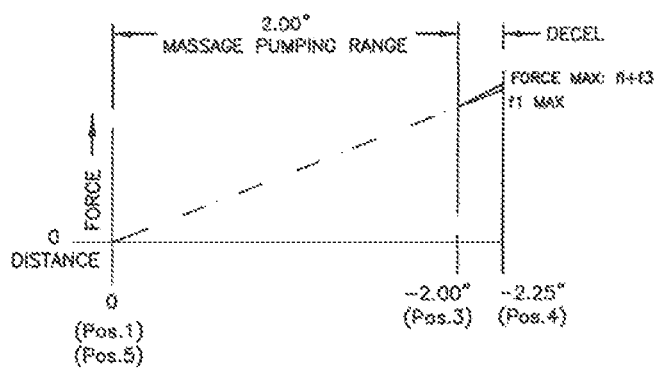
Fig. 9B

Step 1

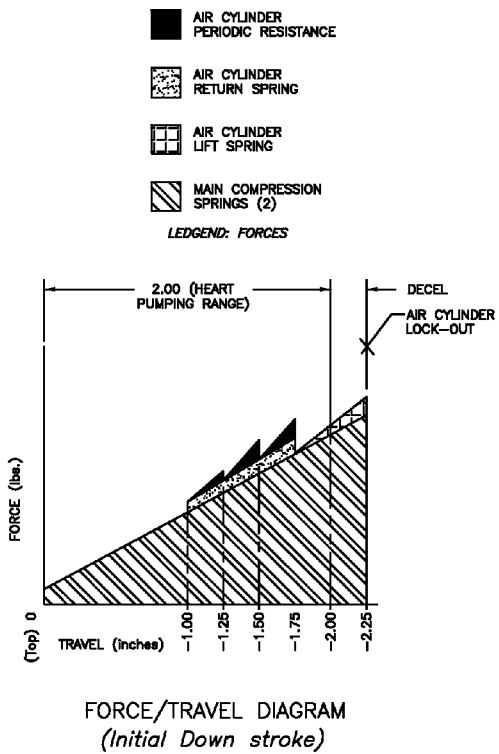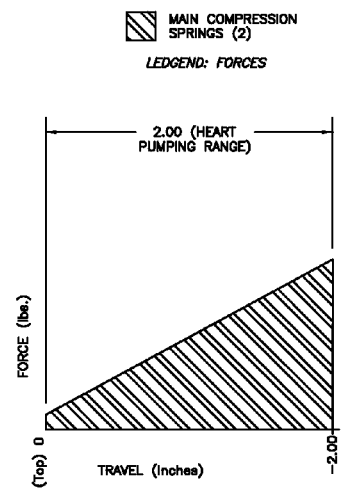
FIG. 16A
FIG. 16B

HEART COMPRESSION SIMULATION DEVICE

CROSS REFERENCE

This application is a continuation-in-part of U.S. patent application Ser. No. 12/753,539 filed Apr. 2, 2010, the disclosure of which is incorporated herein by reference in its entirety.

FIELD OF THE INVENTION

The present invention is directed to training mannequins for practicing cardio-cerebral resuscitation of a child or adult. The present invention is not limited to use for training purposes.

BACKGROUND OF THE INVENTION

Individuals involved in a cardiopulmonary resuscitation (CPR) course are taught how to perform basic chest compressions. However, during a real resuscitation experience one may need to perform compressions such that the costal cartilages in the ribs separate to allow for appropriate massage of the heart to circulate the oxygenated blood. For example, the American Heart Association (AHA) 2010 guidelines recommend compression depths of a minimum of 2 inches, and compressions at this depth may cause the costal cartilages to separate. The present invention features a heart compression simulation device, which simulates the sensation of shearing/tearing the costal cartilages in the ribs during chest compressions (along with the possibility of breaking ribs in the elderly). The device may be used for the Hands-Only™ method of cardiopulmonary resuscitation of the AHA. The device can help teach proper chest compressions (which can help save lives), and can also help lessen an individual's fear of such an experience. The device (when used in a mannequin) can also provide accurate thoracic compression resistance. The device can calculate compressions with a compression counter, which can be used for evaluation of an individual's compression rate and depth.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a heart compression simulation device. In some embodiments, the device of the present invention comprises an actuator that can move between at least a starting position and an end position; a resistance means coupled to the actuator, wherein the resistance means biases the actuator in the starting position; a tear effect providing mechanism, wherein the tear effect providing mechanism provides resistance when the actuator is moved from the starting position to the end position a first time; and a lock-out mechanism adapted to disengage the tear effect providing mechanism after the actuator has been moved from the starting position to the end position the first time such that subsequent movements of the actuator between the starting position and the end position are not hindered by the tear effect providing mechanism. The tear effect providing mechanism functions to provide a sensation of tearing costal cartilages. In some embodiments, the device further comprises a reset mechanism functioning to re-engage the tear effect providing mechanism such that the tear effect providing mechanism again provides resistance when moving the actuator from the starting position to the end position.

In some embodiments, the heart compression simulation device of the present invention comprises a base wherein the resistance means is disposed on the base. In the starting position, the actuator may be positioned above the base (e.g., a certain distance) and in the end position the actuator may be pushed down near or contacting the base.

In some embodiments, the resistance means comprises a spring mechanism, a pneumatic mechanism, a dampener mechanism, or a hydraulic mechanism. In some embodiments, the tear effect providing mechanism comprises a first actuator prong engagement component that engages a first set of actuator prongs disposed on the actuator, the first actuator prong engagement component is adapted to engage the first set of actuator prongs when the actuator is moved from the starting position to the end position. In some embodiments, the first actuator prong engagement component comprises a detent or a leaf spring. In some embodiments, the tear effect providing mechanism comprises a detent mechanism, a leaf spring mechanism, or a pneumatic mechanism.

in some embodiments, the device of the present invention further comprises a first pedestal disposed atop the base, wherein the first set of actuator prongs is disposed on the actuator facing the first pedestal and the first actuator prong engagement component is disposed on the first pedestal. The first actuator prong engagement component may engage the first set of actuator prongs to provide resistance when moving the actuator from the starting position to the end position the first time. In some embodiments, the tear effect providing mechanism further comprises a second actuator prong engagement component adapted to engage a second set of actuator prongs disposed on the actuator. The second actuator prong engagement component is adapted to engage the second set of actuator prongs when the actuator is moved from the starting position to the end position. In some embodiments, the second actuator prong engagement component comprises a detent or a leaf spring.

in some embodiments, the device of the present invention further comprises a second pedestal disposed atop the base, the first pedestal and second pedestal are positioned opposite each other and outside of the actuator, a second set of actuator prongs is disposed on the actuator facing the second pedestal and a second actuator prong engagement component is disposed on the second pedestal, the second actuator prong engagement component engages the second set of actuator prongs to provide resistance when moving the actuator from the starting position to the end position the first time.

In some embodiments, the lock-out mechanism is adapted to move the first actuator prong engagement component away from the first set of actuator prongs. In some embodiments, the first set of actuator prongs comprises a first actuator prong, a second actuator prong, and a third actuator prong. In some embodiments, the second set of actuator prongs comprises a first actuator prong, a second actuator prong, and a third actuator prong.

In some embodiments, the device of the present invention further comprises a reset mechanism functioning to re-engage the tear effect providing mechanism such that the tear effect providing mechanism again provides resistance when moving the actuator from the starting position to the end position.

In some embodiments, when the actuator is pushed downwardly about 1.25 inches from the starting position the tear effect providing mechanism provides a first resistance, when the actuator is pushed downwardly about 1.5 inches from the starting position the tear effect providing mechanism provides a second resistance, and when the actuator is pushed downwardly about 1.75 inches from the starting position the tear effect providing mechanism provides a third resistance. In some embodiments, when the actuator is pushed downwardly about 1.25 inches from the starting position the first actuator prong engagement component engages the first actuator prong, when the actuator is pushed downwardly about 1.5 inches from the starting position the first actuator prong engagement component engages the second actuator prong, and when the actuator is pushed downwardly about 1.75 inches from the starting position the first actuator prong engagement component engages the third actuator prong.

The present invention also features a method of simulating chest compressions. In some embodiments, the method comprises obtaining a simulation device (as described herein) and moving the actuator from the starting position to the end position, wherein the tear effect providing mechanism provides resistance to cause a sensation of tearing costal cartilages and the lock-out mechanism functions to disengage the tear effect providing mechanism when the actuator is in the end position (the first time). In some embodiments, the method further comprises allowing the actuator to move back from the end position to the first position and moving the actuator at least one more time to the end position.

More specifically, in some embodiments, the device of the present invention comprises a base; a spring extending upwardly from the base; an actuator disposed atop the spring, the actuator and base together sandwich the spring, wherein the actuator can move between a starting position wherein the actuator is positioned above the base and an end position wherein the actuator is pushed down near or contacting the base, the actuator is biased in the starting position caused by the spring; a first pedestal and a second pedestal each disposed atop the base; the pedestals are positioned opposite each other and outside of the actuator; a first set of actuator prongs disposed on the actuator facing the first pedestal and a second set of actuator prongs disposed on the actuator facing the second pedestal; a first hub pivotally attached to the first pedestal and a second hub pivotally attached to the second pedestal; and a first detent disposed on the first hub and positioned below the first set of actuator prongs and a second detent disposed on the second hub and positioned below the second set of actuator prongs, the detents are adapted to engage the respective sets of actuator prongs when the actuator is moved to the end position, the detents provide resistance when the actuator is moved to the end position, wherein when the actuator is moved to the end position and the detents engage the respective sets of actuator prongs a sensation is produced. The hubs can each pivot between a disengaged position wherein the hubs are positioned to allow the detents to engage the respective sets of actuator prongs and an engaged position wherein the hubs are positioned to keep the detents out of range of the respective actuator prongs. The device may further comprise a lock-out mechanism configured to pivot the hubs from the disengaged position to the engaged position and secure the hubs in the engaged position thereby keeping the detents out of range of the respective actuator prongs, the lock-out mechanism is activated when the actuator is moved to the end position.

In some embodiments, the device further comprises a guide pin disposed between the base and the actuator. In some embodiments, the first set of actuator prongs comprises a first actuator prong, a second actuator prong, and a third actuator prong and the second set of actuator prongs comprises a first actuator prong, a second actuator prong, and a third actuator prong. In some embodiments, when the actuator is pushed downwardly about 1.25 inches from the starting position the detents each engage the respective first actuator prong, when the actuator is pushed downwardly about 1.5 inches from the starting position the detents each engage the respective second actuator prong, and when the actuator is pushed downwardly about 1.75 inches from the starting position the detents each engage the respective third actuator prong.

In some embodiments, the first hub is pivotally attached to the first pedestal via a first torsion spring, and the second hub is pivotally attached to the second pedestal via a second torsion spring. In some embodiments, the first detent is attached to the first hub, and the second detent is attached to the second hub.

In some embodiments, the lock-out mechanism comprises a first crank pivotally attached to the first pedestal near the base, the first crank having a first end positioned adjacent to the first hub and a second end extending underneath the actuator, the first crank can pivot between an up position wherein the second end is positioned a distance above the base and a down position wherein the second end is moved downwardly to the base, wherein moving the first crank to the down position causes the first hub to pivot to the engaged position; a second crank pivotally attached to the second pedestal near the base, the second crank having a first end positioned adjacent to the second hub and a second end extending underneath the actuator, the second crank can pivot between an up position wherein the second end is positioned a distance above the base and a down position wherein the second end is moved downwardly to the base, wherein moving the second crank to the down position causes the second hub to pivot to the engaged position; a first pin-hub lock extending toward the first hub, the first pin-hub lock can move between a locked position wherein the first pin-hub lock engages a first index hole disposed in the first hub and an unlocked position wherein the first pin-hub lock is free from the first index hole; and a second pin-hub lock extending toward the second hub, the second pin-hub lock can move between a locked position wherein the second pin-hub lock engages a second index hole disposed in the second hub and an unlocked position wherein the second pin-hub lock is free from the second index hole. When the cranks are moved to the down position the cranks pivot the hubs to the engaged position and the pin-hub locks move to the locked position to secure the hubs in the engaged position.

In some embodiments, the device further comprises a reset bar functioning to move the hubs back to the disengaged position from the engaged position. In some embodiments, the device further comprises an actuator decel suspension disposed the actuator, the actuator detent suspension functions to provide increased resistance when the actuator moves to the end position. In some embodiments, the first detent and the second detent each comprise a detent housing with a sliding tongue, the sliding tongues are each biased in an extended direction in the direction of the actuator via a detent spring.

The present invention also features a detent mechanism device. In some embodiments, the detent mechanism device comprises a base; a spring extending upwardly from the base; an actuator disposed atop the spring, the actuator and base together sandwich the spring, wherein the actuator can move between a starting position wherein the actuator is positioned above the base and an end position wherein the actuator is pushed down near or contacting the base, the actuator is biased in the starting position caused by the spring; a first pedestal disposed atop the base in proximity to the actuator; a first set of actuator prongs disposed on the actuator facing the first pedestal; and a first detent disposed on the first pedestal and positioned below the first set of actuator prongs, the first detent is adapted to engage the first set of actuator prongs when the actuator is moved to the end position, the first detent provides resistance when the actuator is moved to the end position, wherein when the actuator is moved to the end position and the first detent engages the first set of actuator prongs a sensation is produced.

In some embodiments, the detent mechanism device further comprises a second pedestal disposed atop the base, the second pedestal is positioned opposite the first pedestal, the pedestals are positioned outside of the actuator; a second set of actuator prongs disposed on the actuator facing the second pedestal; and a second detent disposed on the second pedestal and positioned below the second set of actuator prongs, the second detent is adapted to engage the second set of actuator prongs when the actuator is moved to the end position, the second detent provides resistance when the actuator is moved to the end position, wherein when the actuator is moved to the end position and the second detent engages the second set of actuator prongs a sensation is produced.

In some embodiments, the first detent comprises a first detent housing with a first sliding tongue, the first sliding tongue is biased in an extended direction in the direction of the actuator via a first detent spring. In some embodiments, the second detent comprises a second detent housing with a second sliding tongue, the second sliding tongue is biased in an extended direction in the direction of the actuator via a second detent spring.

In some embodiments, the detent mechanism is used in combination with leaf springs, for example to achieve the sensation or feel of cracking ribs (and/or a sound, e.g., a snapping or cracking sound, is produced).

BRIEF DESCRIPTION OF THE DRAWINGS

FIG. 6A shows the device of the present invention at a starting position (Position 1), wherein the device is at rest prior to a first downward compression. The actuator 2 has been pressed 0 inches from its starting position. FIG. 6B shows the device in Position 2a, wherein the "shearing" starts. With three actuator prongs 22, there are three consecutive snap responses (e.g., Positions 2a, 2b, and 2c), wherein the detents 21 snap over the actuator prongs 22. In some embodiments, Position 2a refers to the actuator 2 being pressed about 1.25 inches from its starting position, Position 2b refers to the actuator 2 being pressed about 1.5 inches from its starting position, and Position 2c refers to the actuator 2 being pressed about 1.75 inches from its starting position. In Positions 2a-2c, the actuator 2 has not been fully moved to the compressed position. FIG. 6C shows the device is Position 3, wherein the detents 21 have passed each actuator prong 22 and the actuator 2 is pushed toward the compressed position. In some embodiments, Position 3 refers to the actuator 2 being pressed about 2 inches from its starting position. In Position 3, the actuator 2 (e.g., actuator decel suspension 50) begins to contact the cranks 24. FIG. 6D shows the device in Position 4, wherein the actuator 2 is in the compressed position, which engages the lock-out mechanism by moving the cranks 24 to the down position (the pin-hub locks 20 become locked in the hubs 47), ultimately moving the detents 21 away from the actuator prongs 22. FIG. 6E shows the device in Position 5, wherein the actuator 2 resumes the starting position (e.g., caused by the compression springs 10 when no downward force is applied to the actuator 2). The lock-out mechanism is set for subsequent compressions of the actuator 2.

FIG. 9A is a force diagram showing force over distance during an initial down stroke.

FIG. 9B is a force diagram showing force over distance during subsequent down strokes (after the lock-out mechanism engages).

FIG. 16A is a force diagram showing force over distance during an initial down stroke.

FIG. 16B is a force diagram showing force over distance during subsequent down strokes (after the lock-out mechanism engages).

DESCRIPTION OF PREFERRED EMBODIMENTS

Referring now to FIGS. 1-17, the present inventions feature a heart compression simulation device, which simulates the sensation of separating the costal cartilages in the ribs during chest compressions. The device can help teach proper chest compressions (which can help save lives), and can also help lessen an individual's fear of such an experience. The device (when used in a mannequin) can also provide accurate heart compression resistance. The device can calculate compressions with a compression counter, which can be used for evaluation of an individual's compression rate and depth.

Generally, upon completion of a full stroke of downward motion (e.g., simulation of separating the costal cartilages in the ribs), a lock-out mechanism is engaged. The lock-out mechanism can be reset (e.g., manual reset) as necessary (e.g., after a student has finished his series of compressions). The lock-out mechanism allows subsequent down strokes in the CPR routine to occur without the reoccurrence of the series of shearing sensations being experienced (simulating a real experience wherein once the patient's ribs are broken with an initial compression the rescue worker would not hear re-cracking of the ribs over and over during subsequent compressions). In some embodiments, the maximum downward movement is about 2.25 inches with a simulated shearing of costal cartilage occurring at approximately 1.25 inches, 1.5 inches, and 1.75 inches of downward travel.

Figure 8:
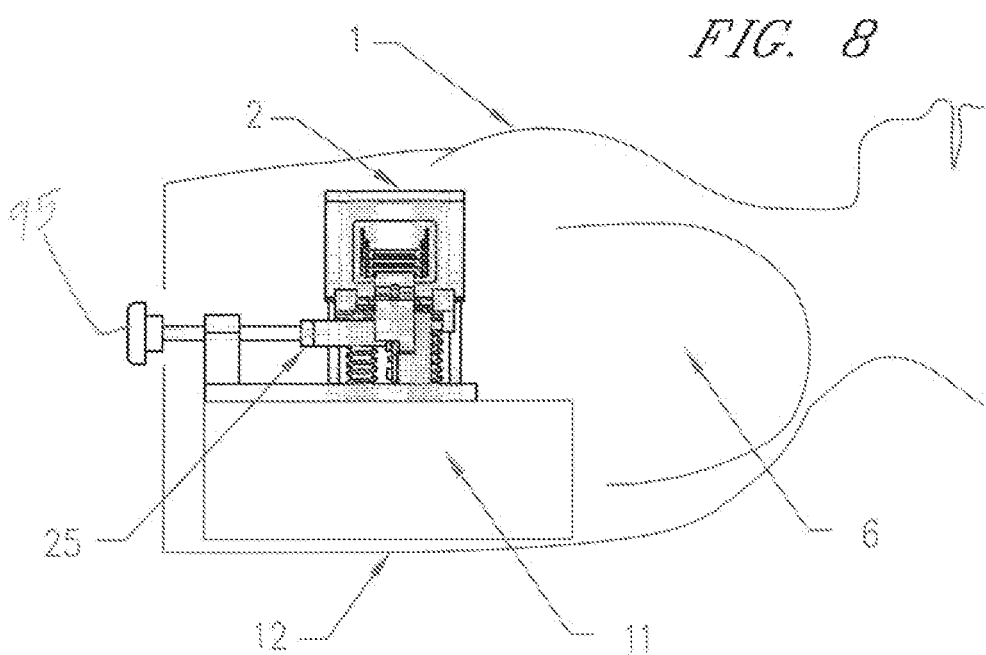
FIG. 8 is an in-use view of the device of the present invention as installed in a mannequin (e.g., torso shell 1). The device is mounted atop a spacer box 11, above the back 12 of the mannequin torso. The spacer box is optional and is not required (e.g., some embodiments lack a spacer box).

The heart compression simulation device of the present invention is often integrated into a mannequin (see FIG. 8). For example, the combination device and mannequin may comprise a simulated human chest/torso membrane, a sternum, and ribs. In some embodiments, the ribs include four internal ribs that can be sheared at the sternum (costal cartilage) when accurate pressure is applied (e.g., appropriate compressions are applied).

Figure 1:
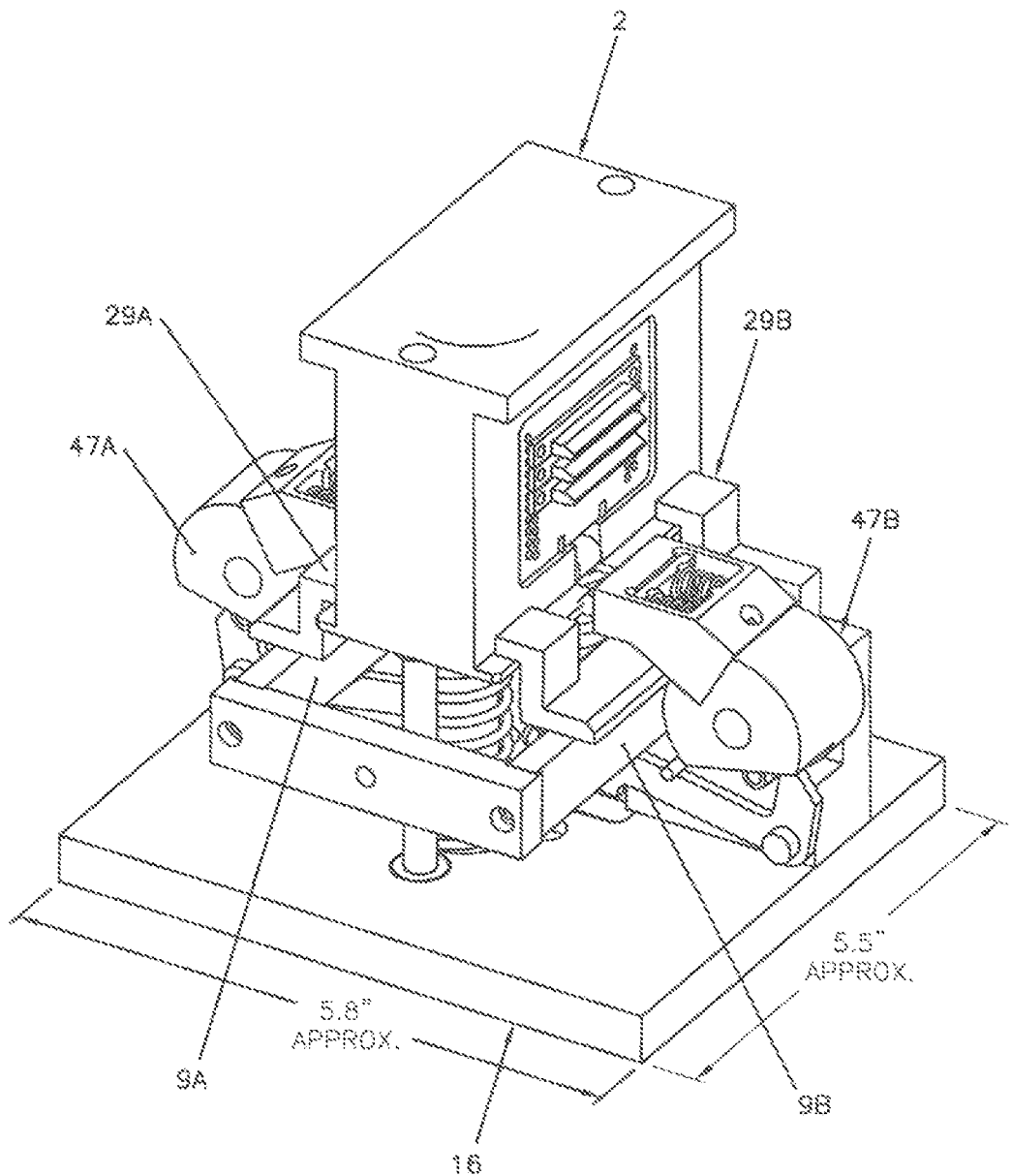
FIG. 1 is an isometric view of the device of the present invention. The device is in a starting position. Dimensions shown are in inches. The present invention is not limited to the dimensions shown in FIG. 1.
Figure 1A:
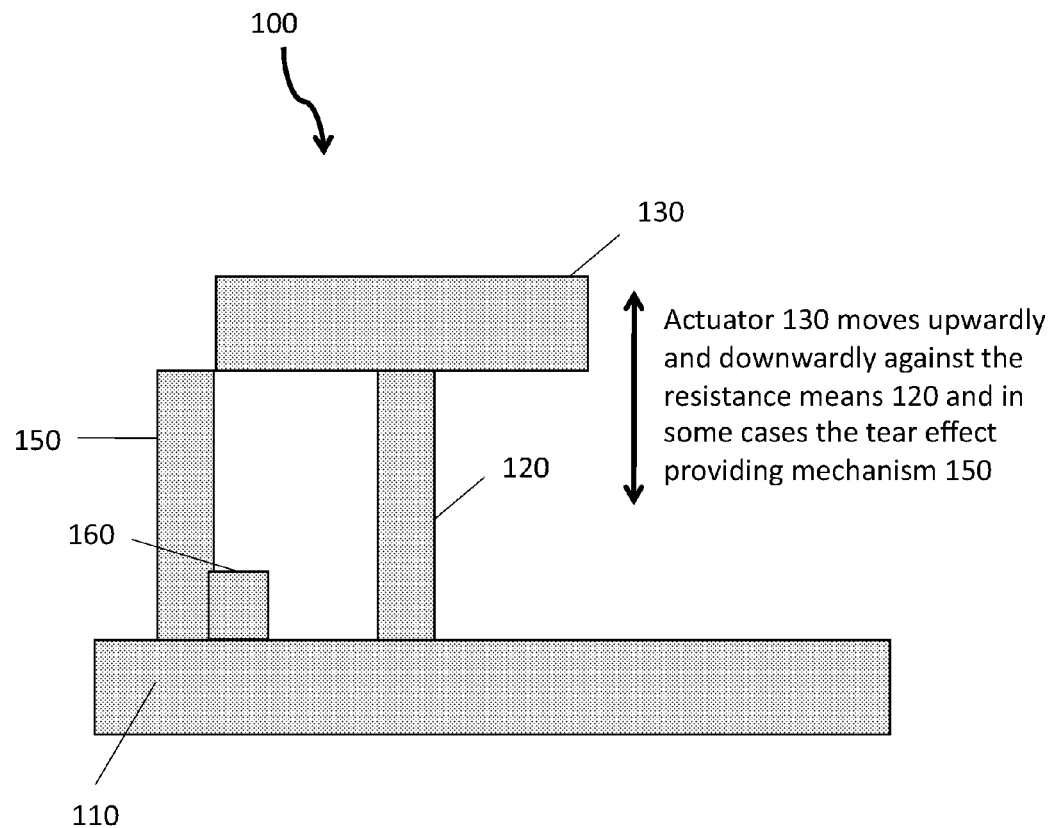
FIG. 1A is a schematic view of the heart compression simulation device of the present invention.
Figure 1B:
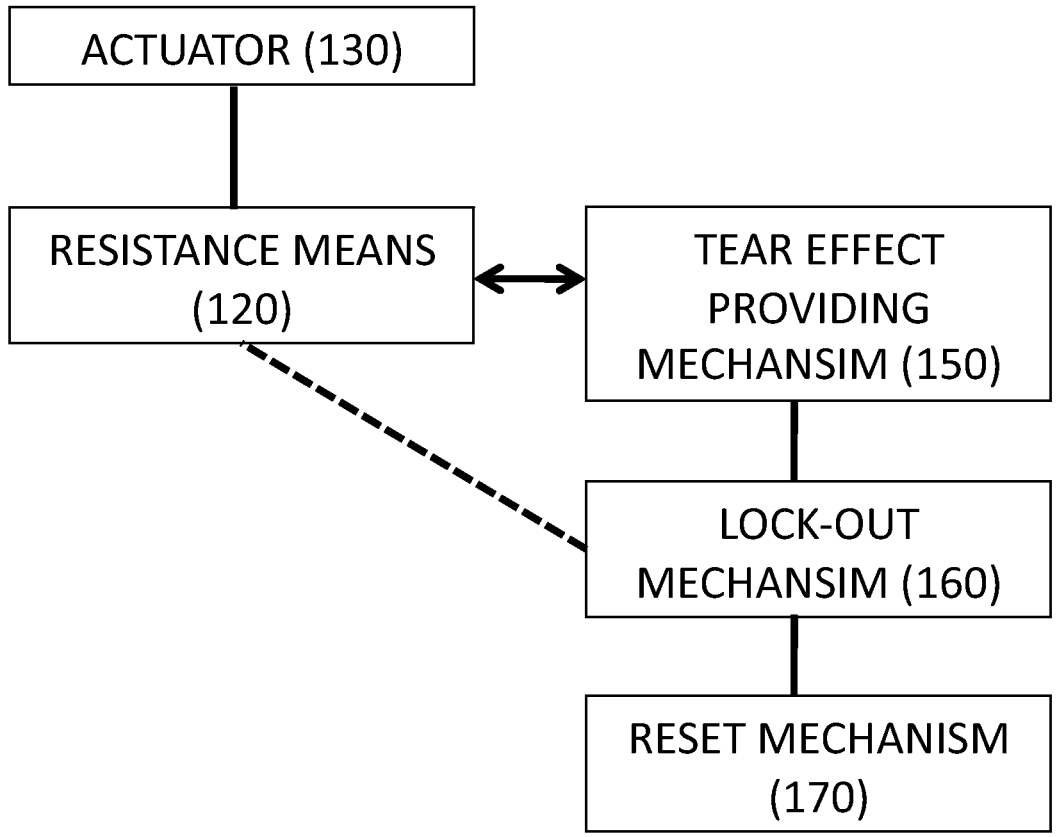
FIG. 1B is a schematic representation of connections between components of the heart compression simulation device of the present invention.
Figure 1C:
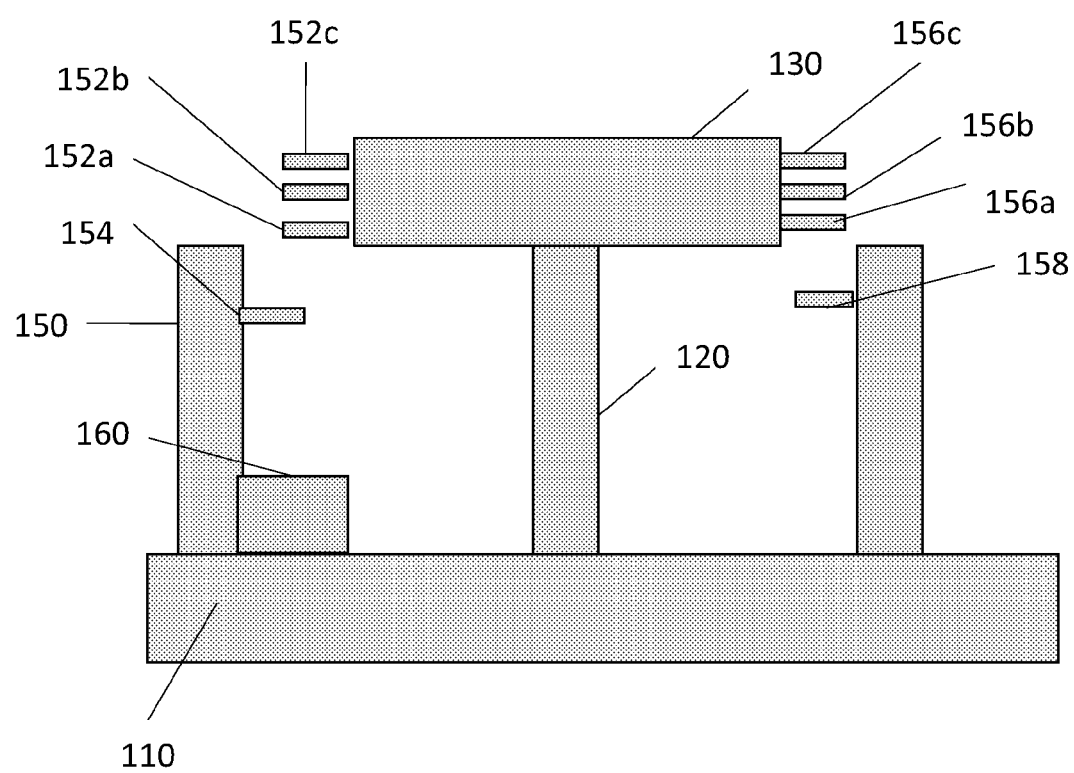
FIG. 1C is a schematic view of the heart compression simulation device of the present invention.

Referring now to FIG. 1A, FIG. 1B, and FIG. 1C, the heart compression simulation device may comprise a base 110, a resistance means 120 disposed on the base 110, and an actuator 130 operatively connected to the resistance means 120 (e.g., positioned atop the resistance means 120). The resistance means may comprise a spring (e.g., a compression spring, etc.), a pneumatic mechanism, a resistance foam material component (e.g., "memory foam"), a dampener mechanism, a hydraulic mechanism, the like, or a combination thereof.

The actuator 130 can move between at least a starting position (e.g., an extended position) wherein the actuator 130 is positioned at a starting position above the base 110 and an end position (e.g., a fully compresses position or a compressed position) wherein the actuator 130 is pushed down near or contacting the base 110. The actuator 130 is biased in the starting position caused by the resistance means 120. The device 100 (e.g., actuator 130) can occupy other positions (e.g., see FIG. 6A-6E).

The device 100 further comprises a tear effect providing mechanism 150, which provides a sensation of tearing costal cartilages and/or cracking ribs. The tear effect providing mechanism provides resistance when moving the actuator 130 from the starting position to the end position the first time the actuator 130 is moved from the starting position to the end position. Generally subsequent movements of the actuator 130 from the starting position to the end position (after the first time) do not involve the tear effect providing mechanism 150). The tear effect providing mechanism 150 is generally operatively connected to the actuator 130 such that movement of the actuator 130 (the first time to the end position) engages the tear effect providing mechanism 150. The tear effect providing mechanism 150 may be disengaged from the actuator 130 after the first movement of the actuator 130 to the end position.

As shown in FIG. 1C, in some embodiments, the tear effect providing mechanism 150 may comprise a first actuator prong engagement component 154 (e.g., a detent mechanism, a leaf spring mechanism, a pneumatic mechanism, etc.) that engages a first set of actuator prongs 152 (e.g., a first actuator prong 152a, a second actuator prong 152b, and a third actuator prong 152c) disposed on the actuator 130. The first actuator prong engagement component 154 is adapted to engage the first set of actuator prongs 152 when the actuator 130 is moved from the starting position to the end position.

In some embodiments, the tear effect providing mechanism 150 further comprises a second actuator prong engagement component 158 (e.g., a detent mechanism, a leaf spring mechanism, a pneumatic mechanism, etc.) that engages a second set of actuator prongs 156 (e.g., a first actuator prong 156a, a second actuator prong 156b, and a third actuator prong 156c) disposed on the actuator 130. The second actuator prong engagement component 158 is adapted to engage the second set of actuator prongs 156 when the actuator 130 is moved from the starting position to the end position.

The device of the present invention further comprises a lock-out mechanism 160 adapted to disengage the tear effect providing mechanism 150 after the actuator 130 has been moved from the starting position to the end position (the first time). The lock-out mechanism 160 causes subsequent movements of the actuator 130 between the starting position and the end position (after the first time) to be unhindered by the tear effect providing mechanism 150. For example, in some embodiments, the lock-out mechanism 160 is adapted to move the first actuator prong engagement component away 154 from the first set of actuator prongs 152.

The device of the present invention further comprises a reset mechanism 170 (e.g., a reset bar). The reset mechanism 170 may be part of the lock-out mechanism 160 (or vice versa). The reset mechanism 170 (e.g., reset bar) functions to re-engage the tear effect providing mechanism 150 (when desired) such that the tear effect providing mechanism 150 again provides resistance (and the sensation of tearing costal cartilages) when moving the actuator 130 from the starting position to the end position. A user can activate the reset mechanism 170 (e.g., a reset bar) after he/she is done practicing compressions, for example, before the next user begins his/her compressions.

In some embodiments, a first pedestal is disposed atop the base 110, the first set of actuator prongs is disposed on the actuator 130 facing the first pedestal, and the first actuator prong engagement component is disposed on the first pedestal. The first actuator prong engagement component engages the first set of actuator prongs to provide resistance when moving the actuator 130 from the starting position to the end position the first time. In some embodiments, a second pedestal is disposed on the base, the first pedestal and second pedestal are positioned opposite each other and outside of the actuator 130, a second set of actuator prongs is disposed on the actuator facing the second pedestal, and a second actuator prong engagement component is disposed on the second pedestal The second actuator prong engagement component engages the second set of actuator prongs to provide resistance when moving the actuator 130 from the starting position to the end position the first time.

In some embodiments, when the actuator 130 is pushed downwardly about 1.25 inches from the starting position the first actuator prong 152a on the actuator 130 engages the first actuator prong engagement component 154. In some embodiments, when the actuator 130 is pushed downwardly about 1.5 inches from the starting position the first actuator prong engagement component 154 engages the second actuator prong 152b. In some embodiments, when the actuator 130 is pushed downwardly about 1.75 inches from the starting position the first actuator prong engagement component 154 engages the third actuator prong 152c.

Referring now to FIG. 1-9, the heart compression simulation device achieves the simulated shearing of the costal cartilage by mechanical means. The heart compression simulation device comprises a main base 16. In some embodiments, one or more guide pins 23 (e.g., a first guide pin, a second guide pin) may extend upwardly from the main base 16. Disposed atop the base 16 are one or more actuator compression springs 10 (e.g., coil spring), e.g., a first actuator compression spring and a second actuator compression spring. In sonic embodiments, the actuator compression springs 10 may be positioned between guide pins 23. In some embodiments, the actuator compression springs 10 may surround the guide pins 23.

Positioned atop the guide pins 23 (and compression springs 10) is an actuator 2. For example, the actuator 2 and base 16 sandwich the compression springs 10. The actuator 2 can move between a starting position (e.g., positioned a certain distance above the main base 16, e.g., a starting position) and an end position (e.g., wherein the actuator 2 is moved toward the main base 16). The actuator 2 is biased in the starting position caused by the compression springs 10. A user can place his hand above the top surface of the actuator 2 and press downwardly to move the actuator 2 to the end position (or the top surface of the actuator 2 is pressed through other material, for example if the device is in a mannequin).

Disposed atop the main base 16 are a first pedestal 17A and a second pedestal 17B, the pedestals 17 being positioned opposite each other and outside of where the actuator 2 is positioned. For example, the first pedestal 17A is positioned at a first edge of the base 16 and the second pedestal 17B is positioned at a second edge of the base 16, the second edge being opposite the first. In an alternative configuration, the actuator is positioned around (e.g., outside) a pedestal 17 (or two or more pedestals, etc.).

In some embodiments, a first cover bar 29A is disposed atop the first pedestal 17A and a second cover bar 29B is disposed atop the second pedestal 17B. As shown in FIG. 1, the first cover bar 29A is disposed atop a first index bar 9A, and the second cover bar 29B is disposed atop a second index bar 9B, the index bars 9 being disposed atop the respective pedestals 17. The cover bars 29 are configured to allow the actuator 2 to move between the starting position and the compressed position. In some embodiments, wing tabs 2C are disposed on the bottom portion of the actuator 2, and the cover bars may help prevent the actuator 2 from moving too far upwardly (when it moves back to the starting position) by engaging the wing tabs 2C.

A plurality of actuator prongs 22 is disposed on the actuator 2. For example, a first set of actuator prongs 22A is disposed on the actuator 2 facing the first pedestal 17, and a second set of actuator prongs 22B is disposed on the actuator 2 facing the second pedestal 17. In some embodiments, the sets of actuator prongs 22 comprise three actuator prongs. The cover bars 29 do not interfere with or engage the actuator prongs 22 when the actuator moves between the starting position and the compressed position (e.g., the cover bars 29 are spaced outside of the actuator prongs 22, for example as shown in FIG. 1).

A first hub 47A is pivotally attached to the first pedestal 17A (e.g., via a first torsion spring 19A). A first detent 21A is disposed on the first hub 47A. A second hub 47B is pivotally attached to the second pedestal 17B (e.g., via a second torsion spring 19B). A second detent 21B is disposed on the second hub 47B. As used herein, the term "detent" may refer to a mechanism that temporarily keeps one part in a certain position relative to that of another and can be released by applying force to one of the parts.

The detents 21 (e.g., in some embodiments a plurality of detents 21) are mounted on opposing hubs 47. The detents 21 comprise a detent housing containing a sliding tongue 86, which is biased in the extended direction (e.g., in the direction of the actuator 2) via utilization of detents 21 or gas pressure. Detents 21 are shown in FIG. 2A. In some embodiments, the first detent 21A comprises a first detent housing 96A with a sliding tongue 86 (e.g., a first sliding tongue 86A), wherein the sliding tongue 86 (e.g., first sliding tongue 86A) is biased in an extended direction in the direction of the actuator 2 via a first detent spring 87A. In some embodiments, the second detent 21B comprises a second detent housing 96B with a sliding tongue 86 (e.g., a second sliding tongue 86B), wherein the sliding tongue 86 (e.g., second sliding tongue 86B) is biased in an extended direction in the direction of the actuator 2 via a second detent spring 87B. Due to a sloping contact ramp on the sliding tongue 86, upon the exertion of downward force imparted by actuator prongs 22 on the actuator 2, the sliding tongues 86 within the detents 21 will slide outwardly until disengaged with the subject actuator prongs 22. As the sliding tongues 86 slide outwardly, increasing resistance is applied to the downward travel of the actuator 2. Upon disengagement, these forces rapidly decrease to a point of resistance compatible with that imparted by the compression springs 10 at that applicable point of travel. After disengagement and passing of the subject actuator prongs 22, the sliding tongues 86 of the detents 21 will slide inwardly to engage subsequent actuator prongs 22. The sequential disengagement of the detents 21 will occur at approximately 1.25 inches, 1.5 inches, and 1.75 inches of actuator travel (e.g., see FIG. 9A-9C).

Generally, the detents 21 are fixed and the actuator prongs 22 travel past the detents 21 (the sliding tongues 86). For example in the configurations shown in FIG. 1-9, the detents 21 surround the actuator 2 and actuator prongs 22, and the actuator 2 and actuator prongs 22 move upwardly and downwardly with respect to the detents 21. However, in an alternative configuration, the detents 21 may pass the actuator prongs 22 (e.g., the prongs 22 being fixed and the detents 21 being a part of the moving components, e.g., the actuator 2).

The detents 21 are configured to engage the actuator prongs 22 disposed on the actuator 2. When the actuator 2 is in the starting position, the detents 21 are situated underneath the lowest of the actuator prongs 22. The detents 21 provide resistance when the actuator 2 is pressed downwardly to the compressed position. This resistance caused by the detents 21 may be similar to resistance experienced when performing compressions on a human (e.g., during a real emergency situation).

When the actuator 2 is pressed, pressure is applied to the detents 21 via the actuator prongs 22. When adequate pressure is applied, the detents 21 are "snapped," or the actuator prongs 22 are moved past the actuator prong to the actuator prong below. The movement of the actuator prongs 22 past the detents 21 (the "snapping" of the detents 21) causes a sensation designed to simulate the tearing of costal cartilages and/or a sound (e.g., including but not limited to a cracking sound, a snapping sound or other sound) designed to simulate the tearing of costal cartilages, for example as it might sound when one is performing compressions in a real emergency situation.

In some embodiments, the device is configured such that the snapping of the detents 21 first occurs when the actuator 2 is pushed downwardly about 1.25 inches. In some embodiments, the device is configured such that snapping of the detents 21 occurs a second time when the actuator 2 is pushed downwardly about 1.5 inches. In some embodiments, the device is configured such that snapping of the detents 21 occurs a third time when the actuator 2 is pushed downwardly about 1.75 inches.

The present invention is not limited to the aforementioned configurations and components (e.g., actuator prongs, detents, compression springs, etc.). For example, other designs may be considered that achieve the features of the present invention such has simulation of resistance (e.g., sensation of rib cracking or tearing of costal cartilages) and/or sounds (e.g., tearing of costal cartilages, rib cracking). Other examples of designs include but are not limited to leaf spring mechanisms that release upon appropriate downward force (e.g., spring-loaded, over-center, mechanical, and/or the like); pneumatic mechanisms wherein compressed air creates resistance to downward movement (e.g., systems comprised of bellows or collapsing chambers, pressure relief valves, check valves, accumulators, and/or the like; the like, or a combination thereof.

Lock-Out/Reset Mechanism

The device of the present invention comprises a lock-out mechanism for moving the detents 21 out of range of the actuator prongs 22. The lock-out mechanism is engaged upon completion of a full stroke of downward motion (e.g., simulation of separating the costal cartilages in the ribs). In some embodiments, the lock-out mechanism can be reset (e.g., manual reset) via a reset button (or reset bar 25) as necessary (e.g., after a student has finished his series of compressions). The present invention is not limited to the components and configurations of the lock-out and reset mechanism described herein. For example other mechanisms that achieve the same end result may also be used.

Figure 4A:
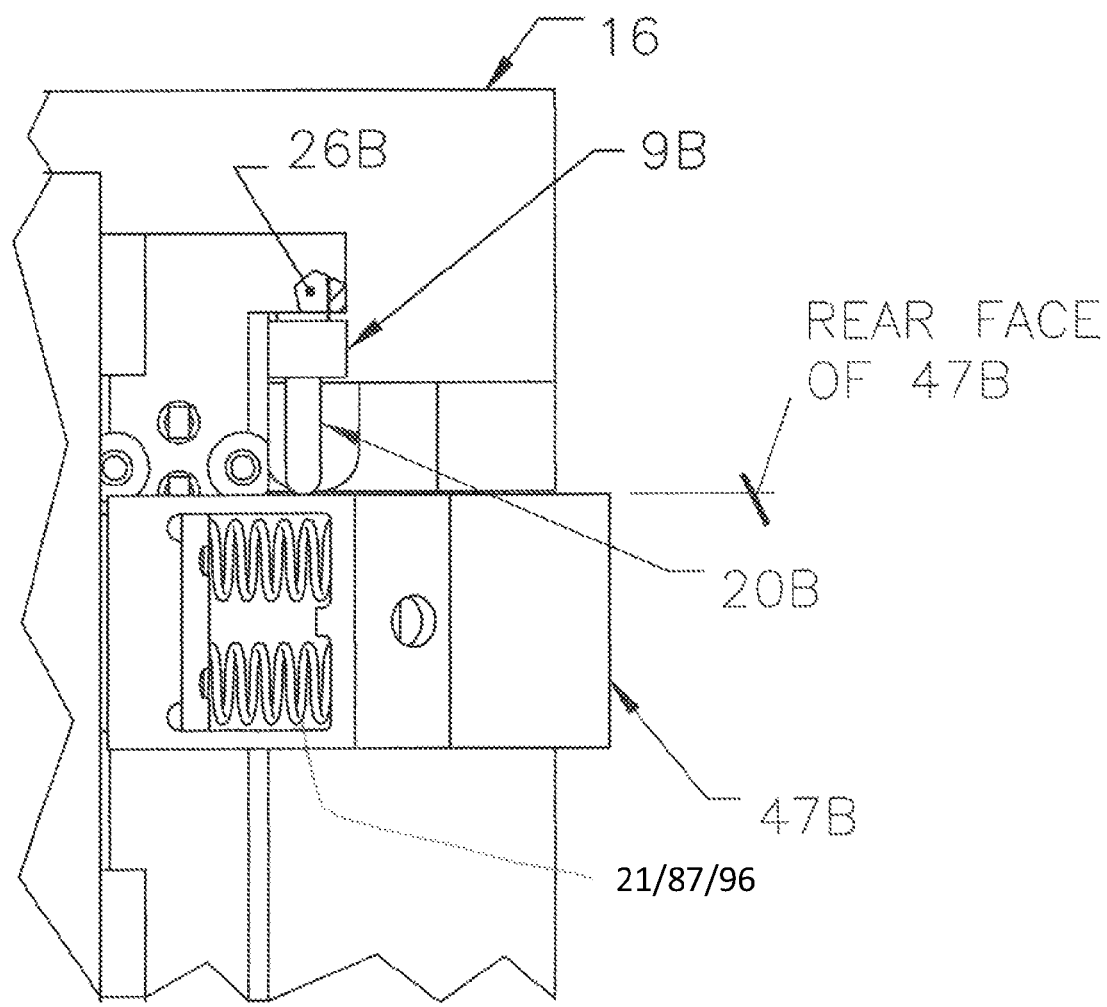
FIG. 4A is a first top view of the hub (upper portion) of the device of the present invention.
Figure 4B:
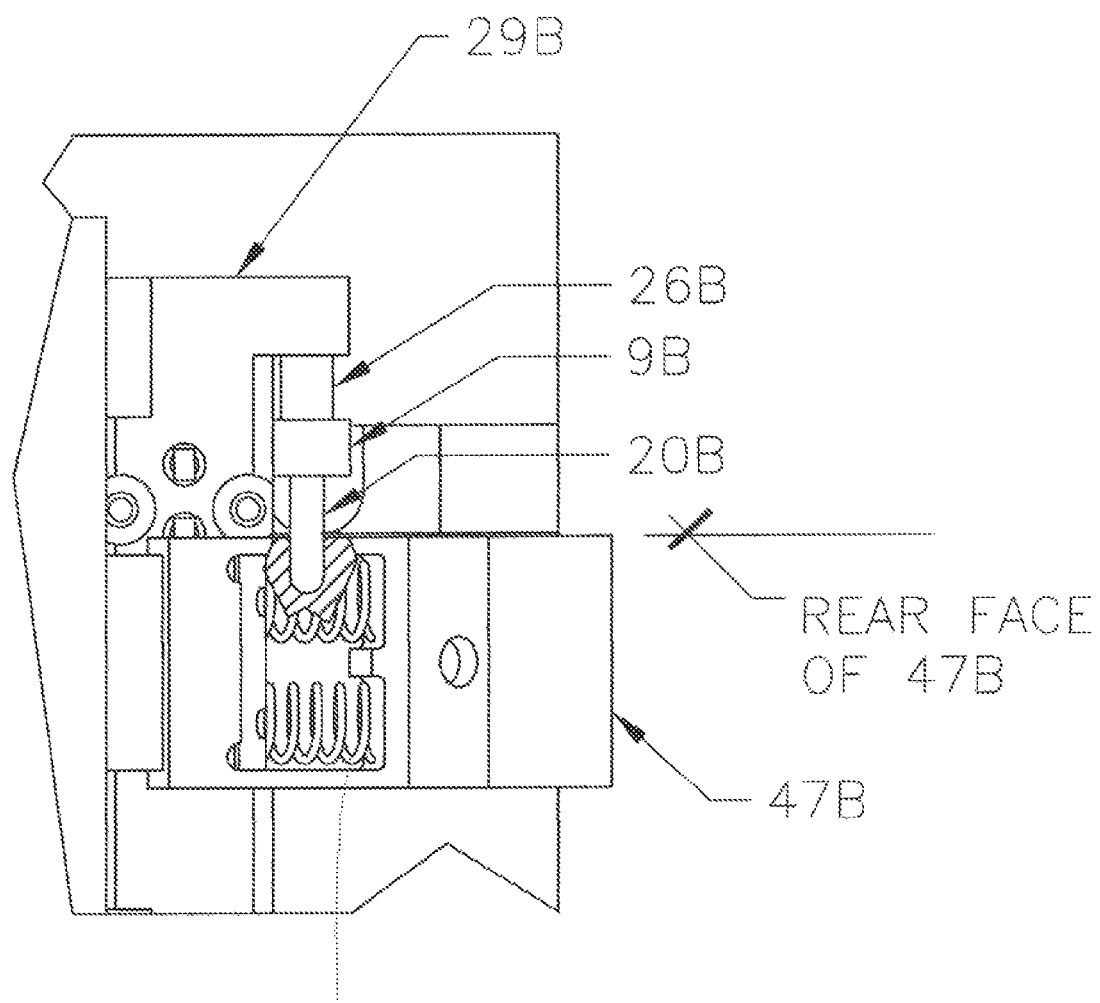
FIG. 4B is a second top view of the hub (upper portion) of the device of the present invention.

Referring now to FIG. 2, FIG. 2B, FIG. 9A, and FIG. 9B, in some embodiments, a first pin-hub lock 20A extends from a slide bar 9 (e.g., a first slide bar 9A), the first pedestal 17A, and/or the first index bar 9A toward the first hub 47A. A second pin-hub lock 20B extends from the slide bar 9 (e.g., a second slide bar 9B), the second pedestal 17B, and/or the second index bar 9B toward the second hub 47B. The first pin-hub lock 20A comprises a first hub lock spring 26A, and the second pin-hub lock 20B comprises a second hub lock spring 26B. The pin-hub locks 20 are adapted to move between an unlocked position (not engaging the respective hubs 47) and a locked position, wherein the locks 20 engage the hubs 47 (e.g., index holes 48 disposed in the hubs 47), thereby locking the movement of the hubs 47. FIG. 4A shows an example of the unlocked position and FIG. 4B shows an example of the locked position.

Figure 2:
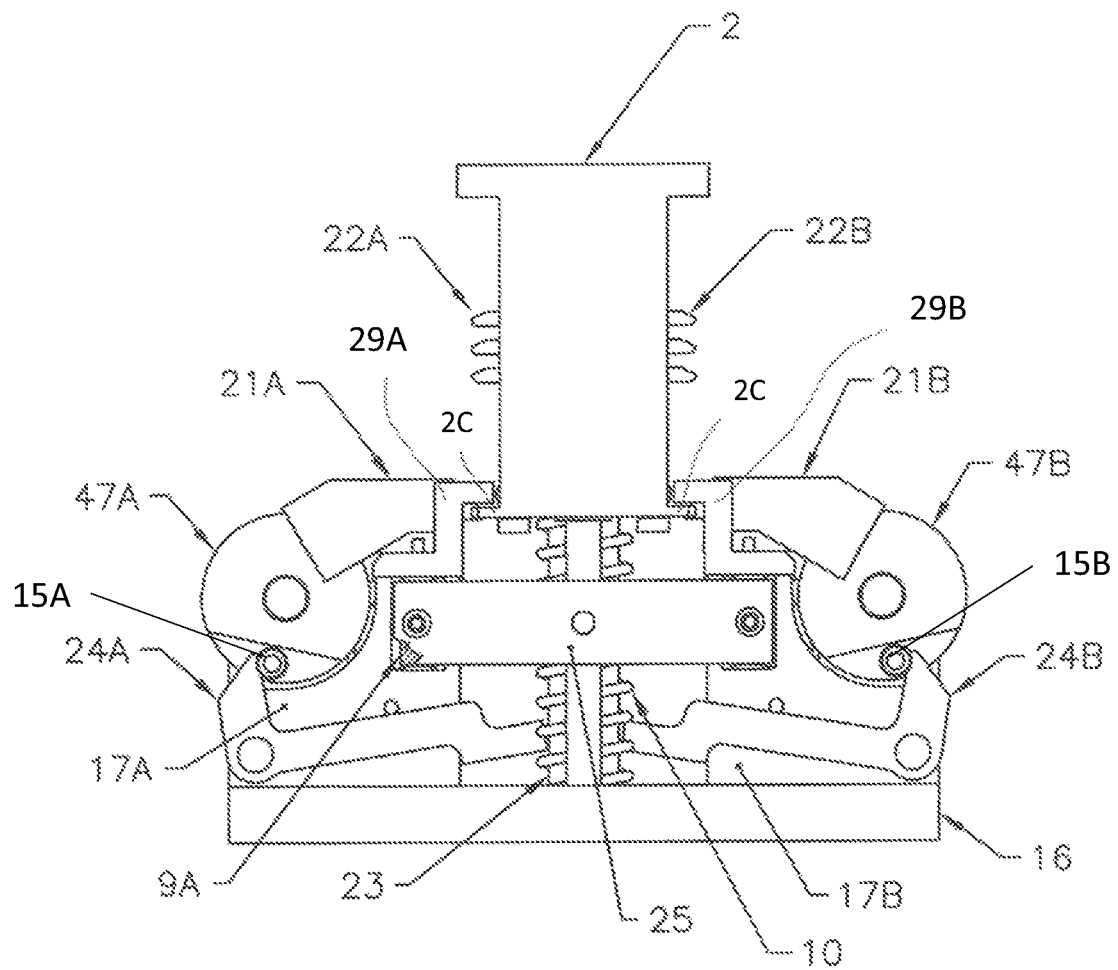
FIG. 2 is a front view of the heart compression simulation device of the present invention. The device is in a starting position.
Figure 2A:
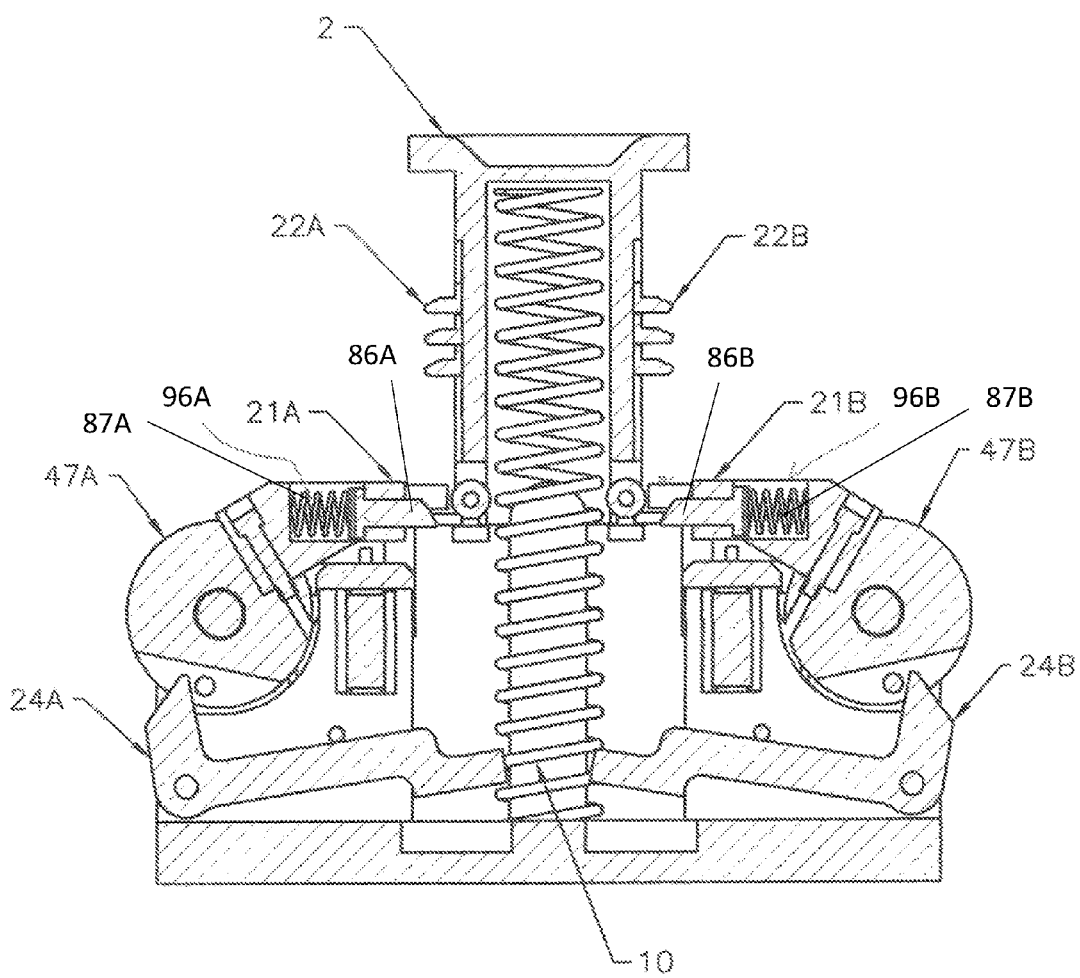
FIG. 2A is a cross sectional view of the heart compression simulation device of FIG. 2.
Figure 2B:
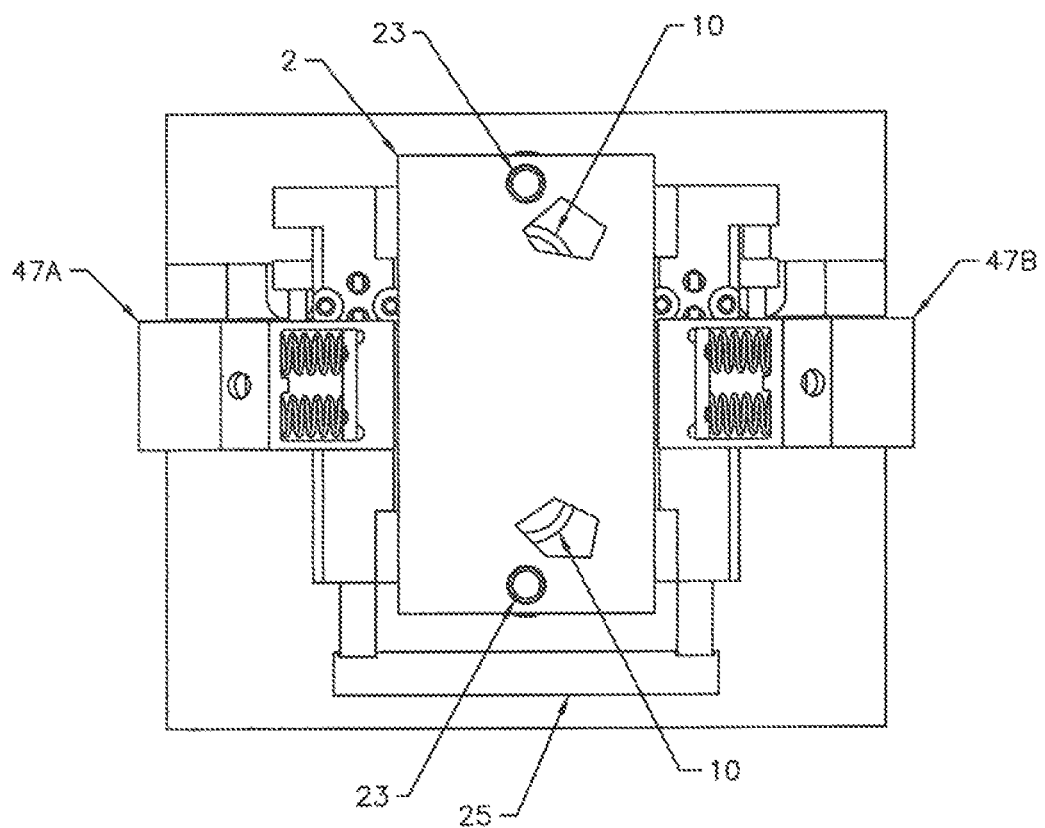
FIG. 2B is a top view and internal view of the heart compression simulation device of the present invention.
Figure 3:
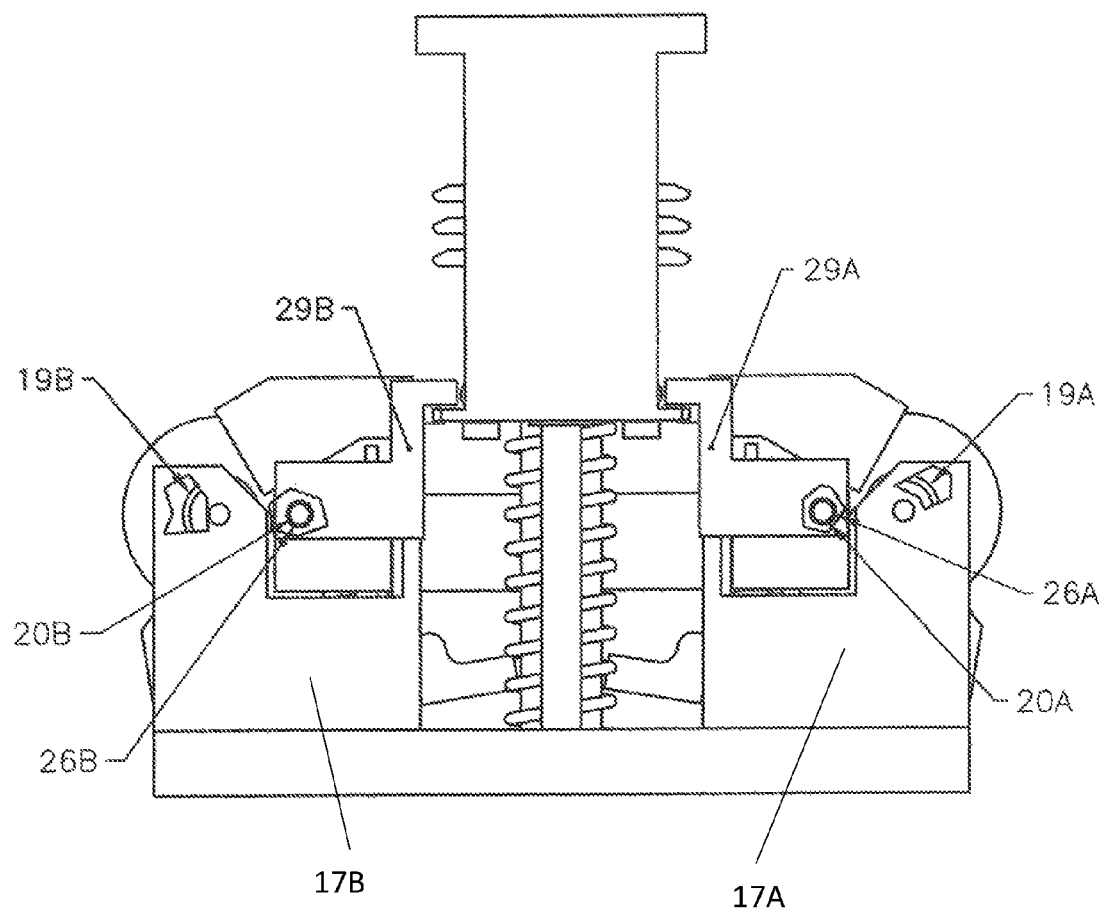
FIG. 3 is a back view of the device of the present invention. The device is in a starting position.
Figure 5A:
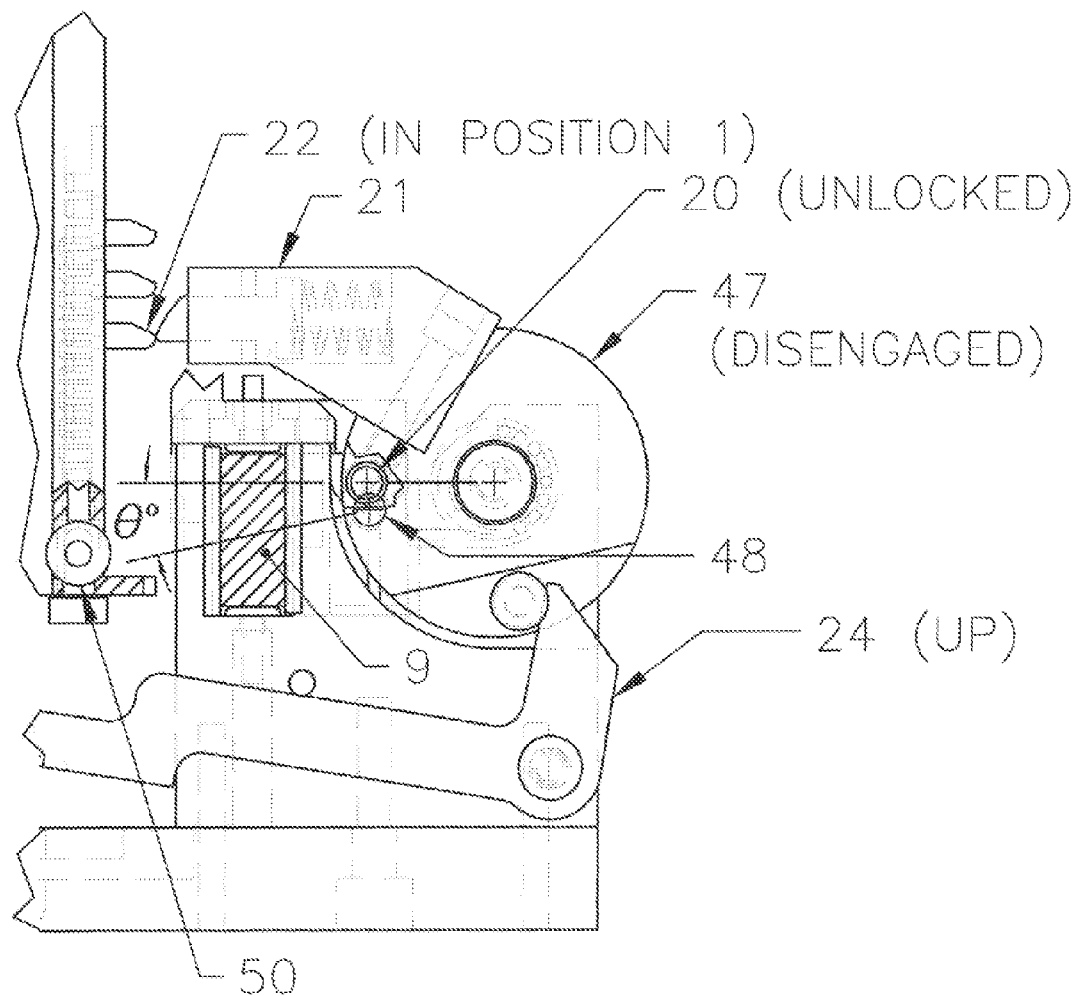
FIG. 5A is a first front detailed view of the device of the present invention.
Figure 5B:
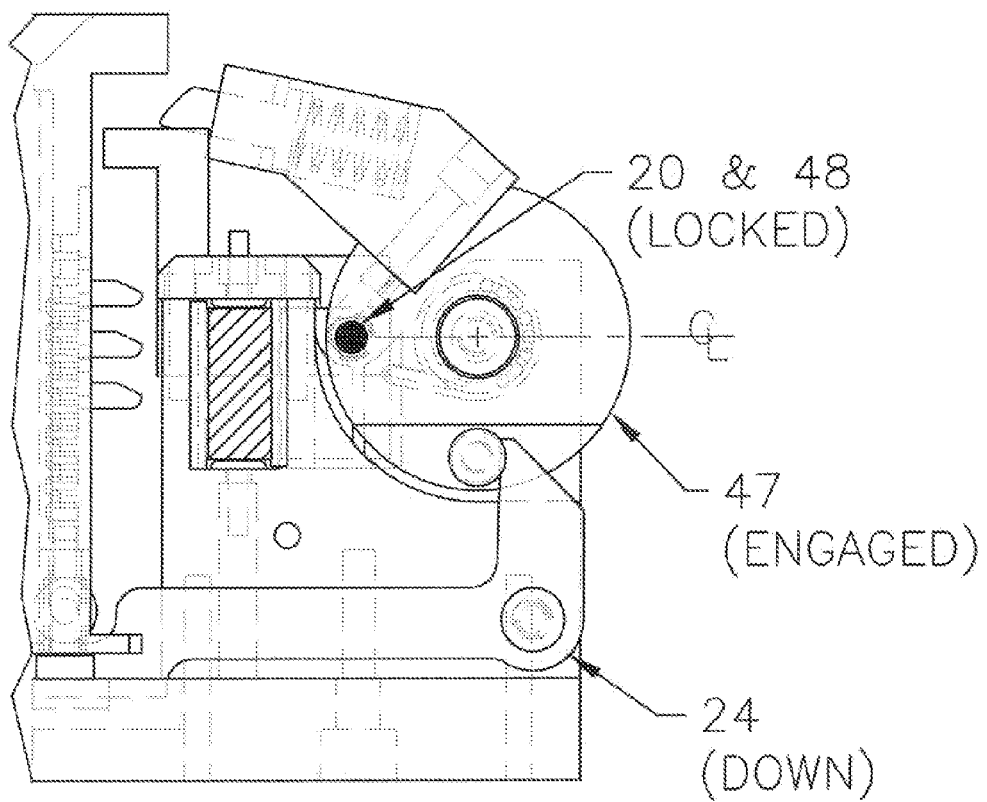
FIG. 5B is a second front detailed view of the device of the present invention.

A first crank 24A may be pivotally attached to the first pedestal 17A near the base 16 (e.g., see FIG. 2). The first crank 24A has a first end and a second end. The first end of the first crank 24A may engage the first hub 47A (or can be pivoted to engage the first hub 47A), e.g., a first roller 15A in the first hub 47A, and the second end of the first crank 24A extends from the first pedestal 17A to underneath the actuator 2. A second crank 24B may be pivotally attached to the second pedestal 17B near the base 16 (e.g., see FIG. 2), The second crank 24B has a first end and a second end. The first end of the second crank 24B may engage the second hub 47B (or can be pivoted to engage the second hub 47B), e.g., a second roller 15B in the second hub 47B, and the second end of the second crank 24B extends from the second pedestal 17B to underneath the actuator 2. The cranks 24 can pivot between an up position wherein the second ends of the cranks 24 are moved upwardly toward the actuator 2 (e.g., not contacting the base 16) and a down position wherein the second ends of the cranks 24 are moved downwardly toward the base 16 (e.g., contacting the base 16). FIG. 1, FIG. 2, and FIG. 5A show the cranks 24 in the up position. FIG. 5B shows the crank in the down position. The cranks 24 are biased in the up position, for example the cranks 24 are moved to the up position before a student begins a series of compressions (e.g., because the cranks 24 in the up position corresponds to the detents 21 being capable of engaging the actuator prongs 22).

Figure 6A:
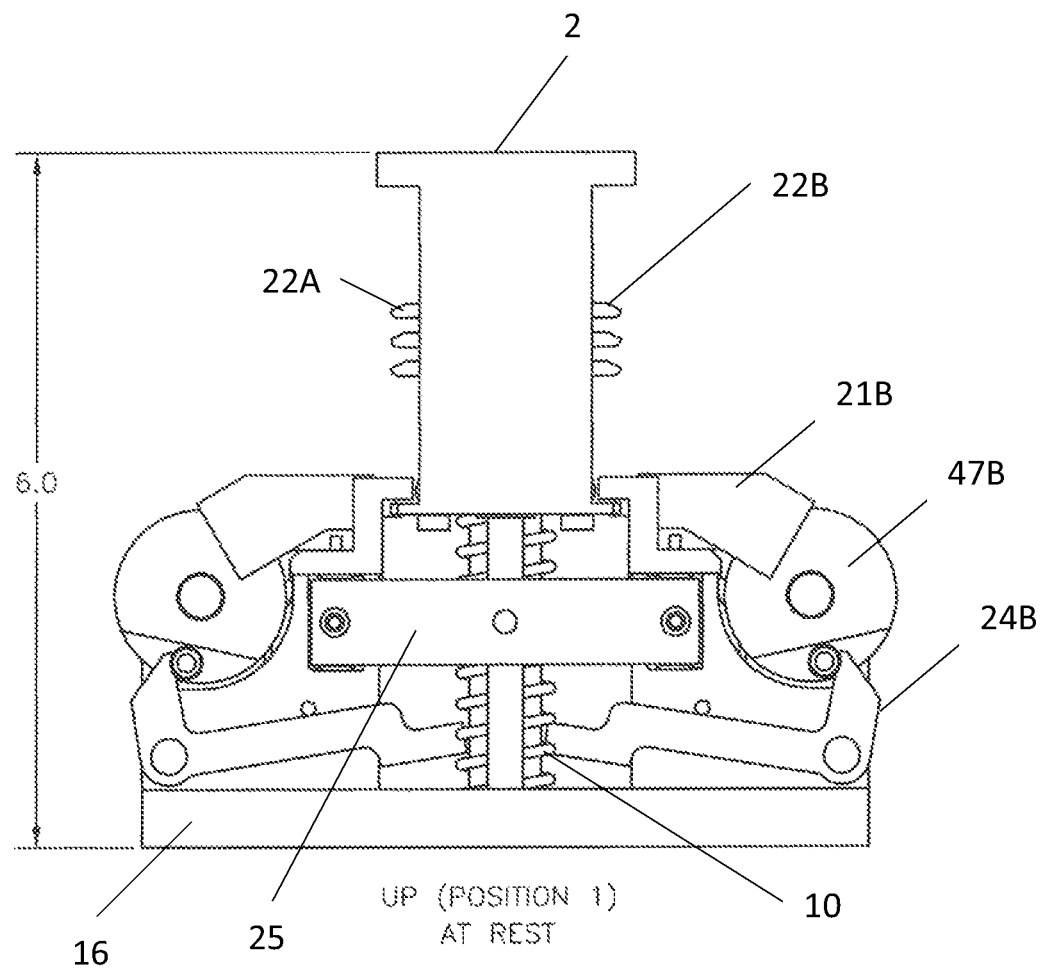
FIG. 6A-6E is a step-by-step representation of the movement of the device of the present invention.
Figure 6B:
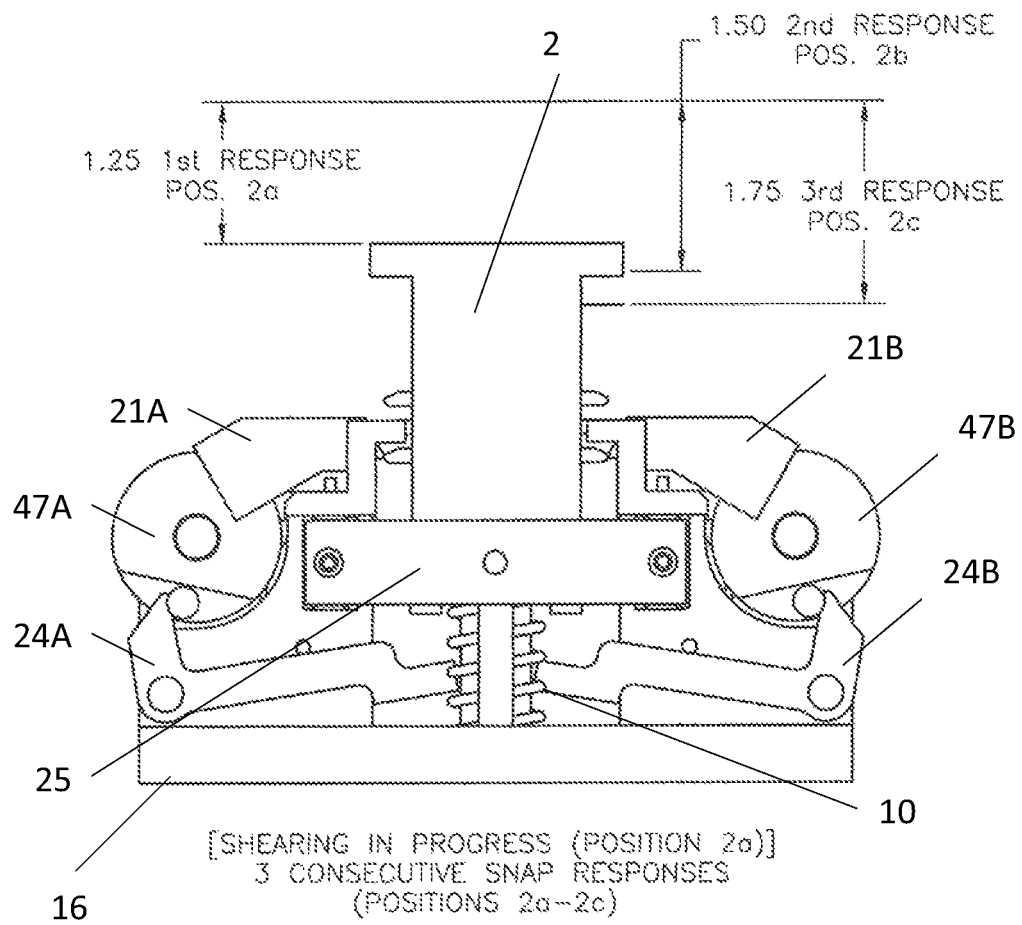

Referring now to FIG. 5A and FIG. 6A, prior to a first downward stroke the actuator 2 is in the starting position, the cranks 24 are in the up position (e.g., FIG. 5A), and the hubs 47 are in a disengaged position. The pin-hub locks 20 are in the unlocked position. The detents 21 are positioned below the actuator prongs 22. Referring now to FIG. 5B and FIG. 6D, when the actuator 2 is moved down to the compressed position, the actuator 2 (e.g., wings 2C) moves the cranks 24 to the down position, which moves the hubs 47 to the engaged position (e.g., the cranks 24 rotate the respective hubs 47), allowing the pin-hub locks 20 to be moved to the locked position (e.g., into the index holes 48 in the hubs 47), thus securing the hubs 47 in the engaged position. With the hubs 47 in the engaged position, the detents 21 are moved (e.g., raised, rotated away, etc., such that they cannot engage the actuator prongs 22 (and cause the sensation of rib cracking or tearing of costal cartilages and/or sound for subsequent compressions). The actuator 2 can be used for subsequent compressions with the hubs 47 engaged with the pin-hub locks 20.

The detents 21 are held out of use until they are reset with the reset bar 25. For example, pressing the reset bar 25 may move the pin-hub locks 20 to the unlocked position, allowing the hubs 47 to move to the disengaged position, and the cranks 24 to move to the up position.

Referring again to FIG. 5A, in some embodiments, an actuator decel suspension 50 (e.g., a spring axle and/or roller) is disposed on the bottom of the actuator 2. When the actuator 2 is moved to the compressed position, the actuator decel suspension 50 presses down on the cranks 24 and/or base 16. The actuator decel suspension 50 can provide some resistance when contacting the cranks 24 and/or base 16.

FIG. 6A shows the device of the present invention at a starting position (Position 1), wherein the device is at rest prior to a first downward compression. The actuator 2 has been pressed 0 inches from its starting position. FIG. 6B shows the device in Position 2a, wherein the "shearing" starts. With three actuator prongs 22, there are three consecutive snap responses (e.g., Positions 2a, 2b, and 2c), wherein the detents 21 snap over the actuator prongs 22. In some embodiments, Position 2a refers to the actuator 2 being pressed about 1.25 inches from its starting position, Position 2b refers to the actuator 2 being pressed about 1.5 inches from its starting position, and Position 2c refers to the actuator 2 being pressed about 1.75 inches from its starting position. In Positions 2a-2c, the actuator 2 has not been fully moved to the compressed position.

Figure 6C:
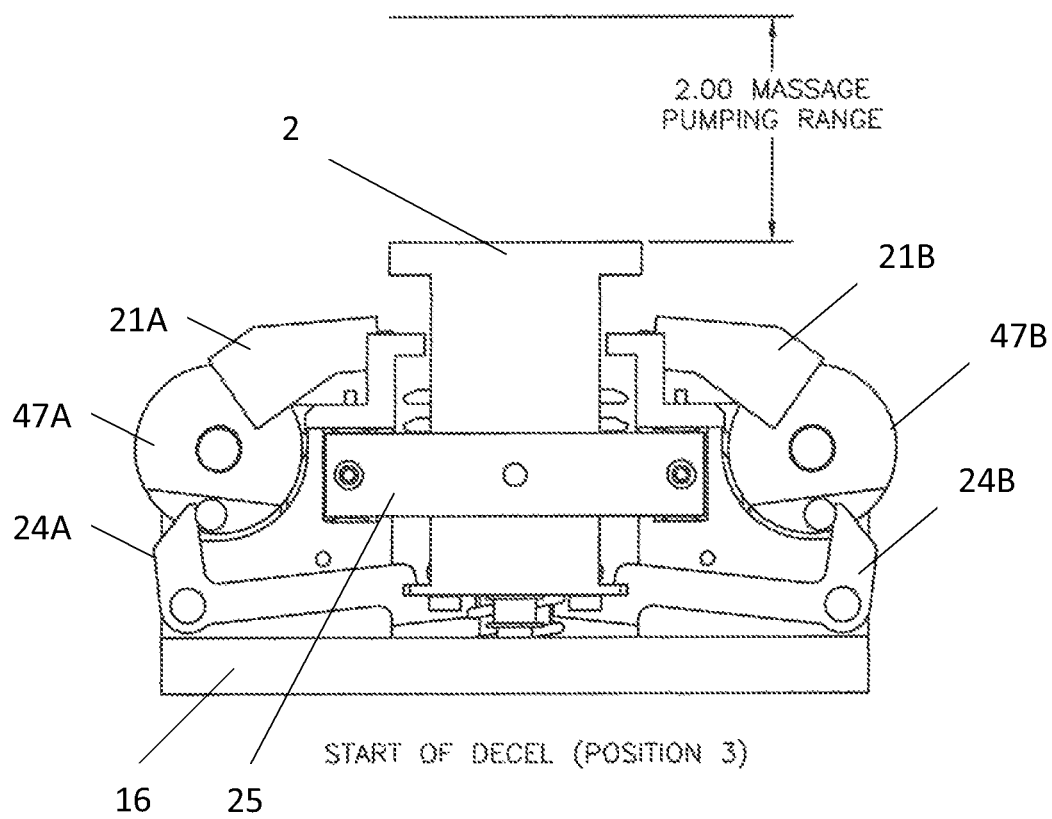
Figure 6D:
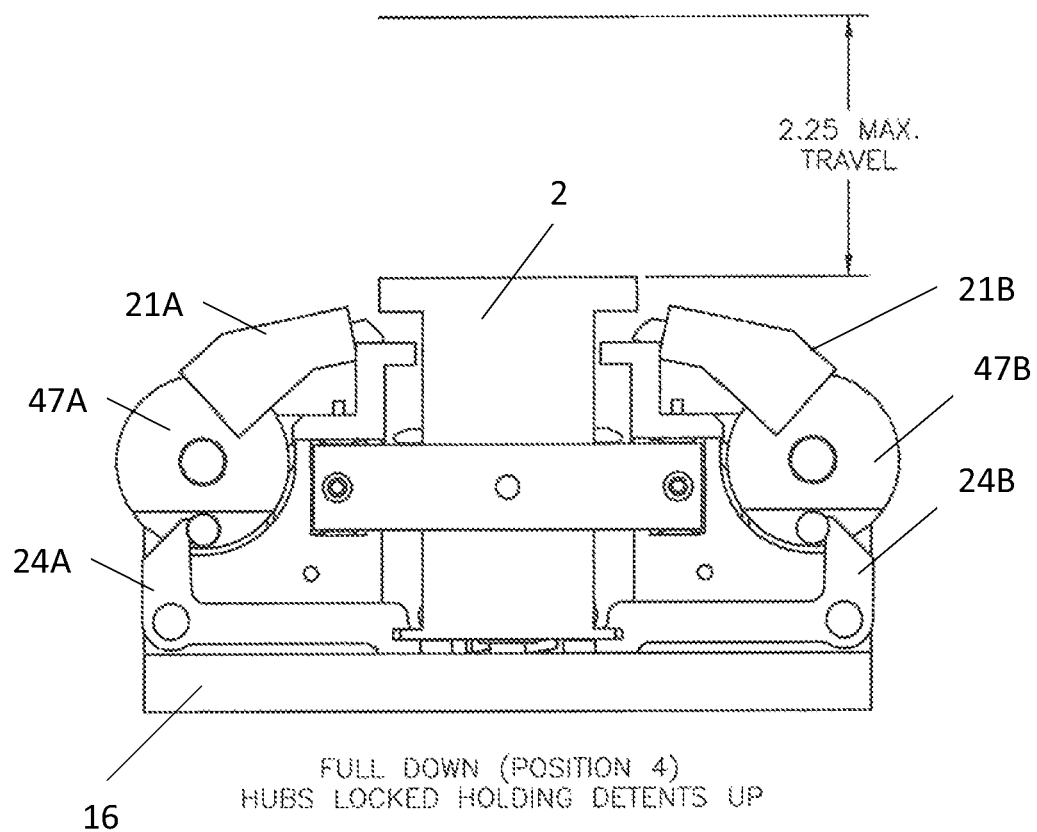

FIG. 6C shows the device is Position 3, wherein the detents 21 have passed each actuator prong 22 and the actuator 2 is pushed toward the compressed position. In some embodiments, Position 3 refers to the actuator 2 being pressed about 2 inches from its starting position. In Position 3, the actuator 2 (e.g., actuator decel suspension 50) begins to contact the cranks 24.

Figure 6E:
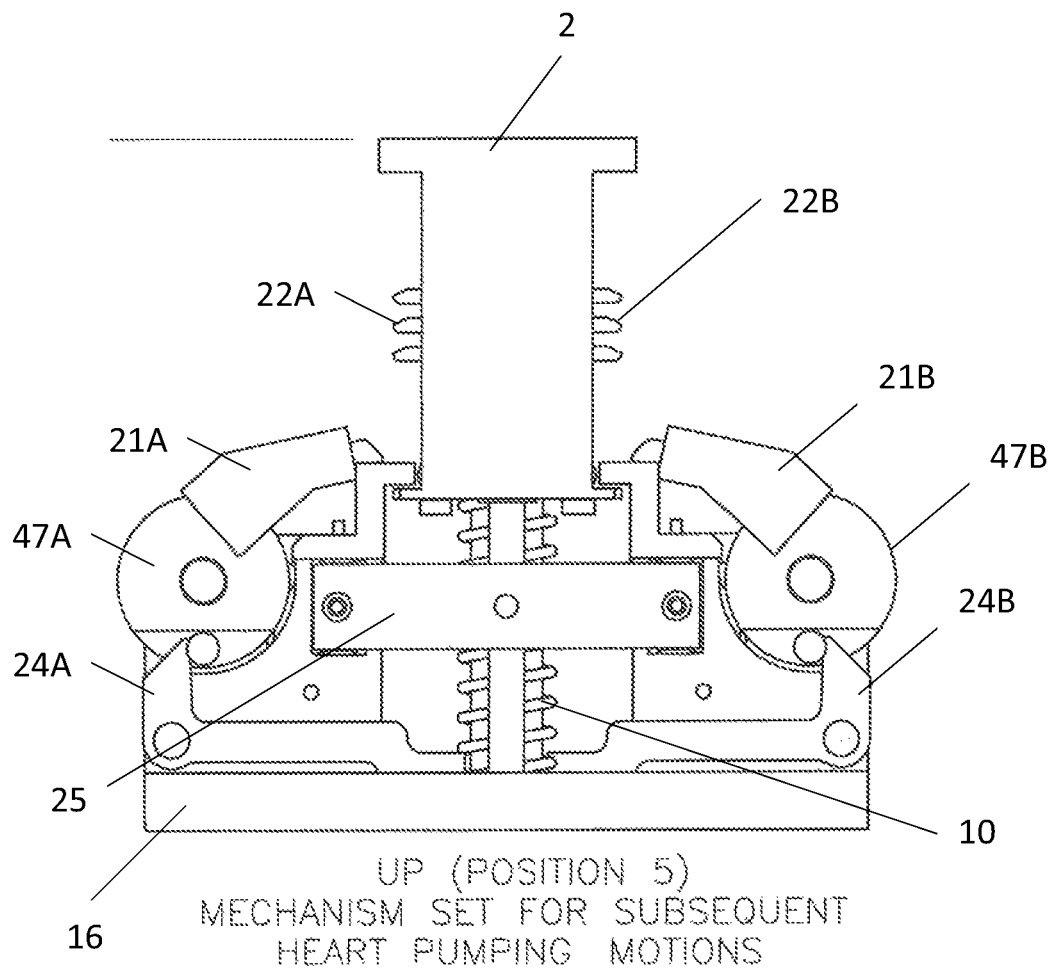
Figure 7:
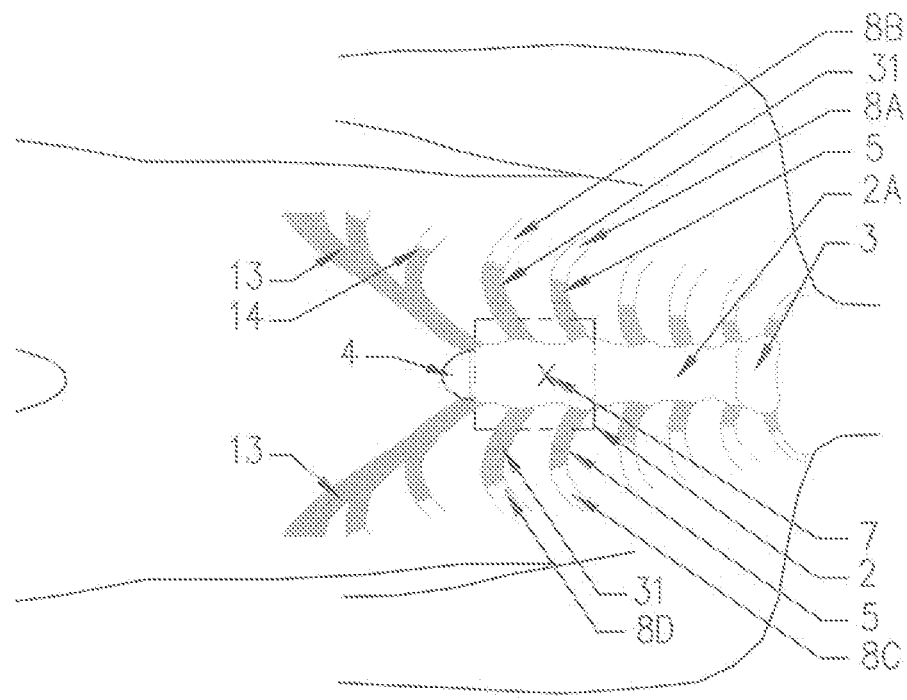
FIG. 7 is a top view of a mannequin torso shell 1. Simulated mannequin components such as sternum body 2A, manubrium 3, xiphoid process 4, costal cartilage 5, 13, 31, palm placement 7 for heart compressions, right side #5 rib 8A, right side #6 rib 8B, left side #5 rib 8C, left side #6 rib 8D, arm/shoulder 6, simulated costal cartilage for ribs 5, 13, 31 (e.g., ribs #7, #8, #9, & #10), and costochondrial junctions 14 (between rib bone and costal cartilage).

FIG. 6D shows the device in Position 4, wherein the actuator 2 is in the compressed position, which engages the lock-out mechanism by moving the cranks 24 to the down position (the pin-hub locks 20 become locked in the hubs 47), ultimately moving the detents 21 away from the actuator prongs 22. FIG. 6E shows the device in Position 5, wherein the actuator 2 resumes the starting position (e.g., caused by the compression springs 10 when no downward force is applied to the actuator 2). The lock-out mechanism is set for subsequent compressions of the actuator 2.

Sensors and Compression Counters

In some embodiments, one or more sensors are disposed on the device configured to determine the depth of the compressions. The sensors can help determine if compressions are appropriate (e.g., not too deep, not too shallow). The sensors may be operatively connected to the springs or to other components of the device. The sensors are operatively connected to a microprocessor housed in the device. In some embodiments, the microprocessor comprises memory storage components for storing pre-recorded messages, for example "too deep." In some embodiments, the microprocessor is operatively connected to a speaker component for emitting the pre-recorded messages when necessary.

In some embodiments, when the sensor detects the compression is too deep (e.g., about 2.25 inches), the sensor sends a first input signal to the microprocessor. Upon receipt of the first input signal, the microprocessor sends a first output command to the speaker to cause the speaker to emit a first pre-recorded sound, for example "too deep."

The device further comprises a clicker counter designed to count the number of times the actuator 2 is pressed down toward the compressed position. The clicker counter may be operatively connected to the microprocessor. In some embodiments, the clicker counter may be used to calculate the rate at which the actuator 2 is pressed to the compressed position. For example, the microprocessor may be operatively connected to a timer, whereby the microprocessor can calculate the number of compressions counted by the clicker counter in a certain period of time. In some embodiments, the timer can be set for a certain length of time (e.g., 1 minute). The timer may allow an individual (e.g., a student) to evaluate his/her compressions per minute, for example. The microprocessor may be operatively connected to a display for displaying the number of compressions and/or compression rate.

In some embodiments, the clicker counter is configured to count only the compressions that are deep enough to be effective, for example about 1 inch deep, about 1.5 inches deep, about 2 inches deep, etc. Information obtained by the sensor (that senses depth of the compressions) may be combined with the clicker counter to calculate the number of effective compressions.

In some embodiments, an appropriate number of compressions per minute is between about 75 to 100 compressions for adults.

Forces

In some embodiments, the device of the present invention builds with pounds of force as it is pressed (e.g., compression springs 10 first, then detents 21) to a desired downward force (e.g., about 85 to 120 pounds, for example 90 pounds of downward force, for adults). The downward force is not limited to the aforementioned ranges. For example, in some embodiments, the downward force may be less to a degree that is appropriate for children. Then the actuator 2 is released (e.g., just after the detents 21 pass the actuator prongs 22). This may replicate the human chest cavity. The chest cavity will increase resistance even after the costal cartilages are torn with further compression of the chest.

The actuator 2 has an upward force imparted on it via compression springs 10 (and/or other compressible material). The force is generally augmented (in the applicable portion of motion) via detents 21. The detents 21 cause an increase in resistance to downward travel, which will then be released (e.g., periodically) by the mechanisms of the device of the present invention to simulate the occurrences of the shearing action (e.g., via three actuator prongs 22).

Figure 9C:
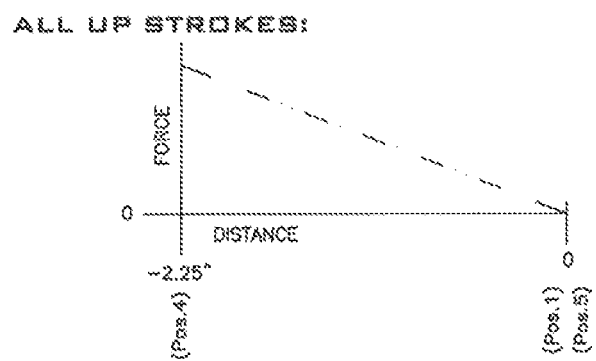
FIG. 9C is a force diagram showing force over distance during up strokes.

Referring now to the force symbols in the FIG. 9A-9C, f1a-f1e refers to the main compression springs at various points of travel, for example length compressed by spring rate (e.g., lbs/inch) at positions 2-4; f2a-f2c refers to the force to overcome forces imparted by the detents at each shearing position (e.g., positions 2a-2c); and f3 refers to the force of the actuator/crank roller's "decal spring suspension." The force notations may ignore preload values imparted to the compression spring, which may be needed but may be minor.

Dimensions

The device of the present invention may be constructed in a variety of sizes. The present invention is not limited to the dimensions disclosed herein. For example, in some embodiments the base 16 is larger than the base 16 shown in FIG. 1. In some embodiments, the reset bar 25 is larger (e.g., longer, wider, farther from the actuator 2) than the reset bar 25 shown in FIG. 2 and FIG. 2B. For example, FIG. 8 shows a reset bar knob 95 engaging a reset bar 25 on the device of the present invention. The extended reset bar or reset bar knob 95 allows the device to be reset farther away than from directly on the device.

As used herein, the term "about" refers to plus or minus 10% of the referenced number. For example, an embodiment wherein the base 16 is about 5.5 inches in width includes a base 16 that is between 4.95 and 6.05 inches in width.

Pneumatic Mechanism

In some embodiments, the resistance means 120 and/or the tear effect providing mechanism 150 of the device of the present invention is a pneumatic mechanism. For example, the resistance means 120 and/or the tear effect providing mechanism 150 may incorporate the use of one or both (or others) spring forces and/or airflow resistance to derive a controlled reluctance against downward motion (e.g., of the actuator 130). For example, in some embodiments, a combination of springs can provide both parallel and series/parallel linear forces. In some embodiments, the user of periodic air pressure build-ups and reliefs will simulate the shearing and severing of costal cartilages, for example at approximately 1.25, 1.5 and 1.75 inches of downward motion (e.g., of the actuator 130). An air cylinder may supply air pressure. Pop relief valves (pop valves), accumulators, and flow restrictors may regulate flow within branches of a pneumatic network (e.g., three branches) and afford appropriate pressure for operation. In some embodiments, the air cylinder comprises a return spring to extend its shaft when in a normal state. The air cylinder may be fitted with a spring loaded shut-off valve (biased in the open position) in series with a check valve, which will give access to outside air when required. In some embodiments the pop valves can be adjusted to release pressure at specific values. The pop valves may open at a specific set pressure and close instantly below the specific set pressure. In some embodiments, the accumulators are elastic in nature and expand slightly on input from the exhaust of the pop valves. The accumulators may have a relatively small volumetric capacity sufficient to allow flow through the pop valves to specifically calibrated flow restrictors. The flow restrictors may add a time delay to the evacuation of the accumulators and prevent a rapid dumping of pressure in the subject branch. Subsequent pop valves may experience ascending pressure until opening occurs.

Referring now to FIG. 10-16, the heart compression simulation device comprises a main base 905. Disposed atop the base 905 (and extending upwardly from the base 905) are one or more compression springs 916 (e.g., "main compression springs," e.g., coil springs), e.g., a first compression spring and a second compression spring. The compression springs 916 may be positioned opposite each other with respect to the base 905 (e.g., one near a first side of the base 905 and another near a second opposite side of the base 905).

Positioned atop the compression springs 916 is an actuator 902. For example, the actuator 902 and base 905 sandwich the compression springs 916. The actuator 902 can move between a starting position (e.g., positioned a certain distance above the main base 905, e.g., a starting position) and an end position (e.g., wherein the actuator 902 is moved toward the main base 905). The actuator 902 is biased in the starting position caused by the compression springs 916. A user can place his hand above the top surface of the actuator 902 and press downwardly to move the actuator 902 to the end position (or the top surface of the actuator 902 is pressed through other material for example if the device is in a mannequin).

In some embodiments, the outer side edges of the actuator 902 extend downwardly toward the base 905. In some embodiments, rollers 912 are disposed on the bottom edges (of the outer side edges) of the actuator 902.

In some embodiments, the device comprises one or more alignment pins 908, which connect the actuator 902 to the base 905, for example for stability of the actuator 902. In some embodiments, the alignment pins 908 are positioned outside of the compression springs 916. In some embodiments, the top ends of the alignment pins 908 are telescopically received in alignment pin shafts disposed in the actuator 902 such that when the actuator 902 is pressed downwardly to the compressed position the alignment pins 908 do not prevent movement of the actuator 902.

Disposed atop the base 905 and positioned in between the compression springs 916 is an air cylinder spring 915. An air cylinder 903 is disposed on the top end of the air cylinder spring 915. Or, in some embodiments, an air cylinder mount 907 is disposed on the top end of the air cylinder spring 915, and the air cylinder 903 is disposed atop the air cylinder mount 907. The air cylinder 903 provides air pressure. A space exists between the actuator 902 and the top surface of the air cylinder 903. A shaft 933 may extend upwardly from the air cylinder 903 (e.g., the shaft 933 being connected to the piston 931 of the air cylinder 903), and the space may exist between the actuator 902 and the top of the shaft 933. In some embodiments, the space is about 1 inch (e.g., when the actuator 902 is in the starting position). The space is not limited to about 1 inch. In some embodiments, a contact pad is disposed on the top surface of the air cylinder 903.

The air cylinder 903 comprises a spring-loaded shut-off valve 921. The shut-off valve 921 can move between an open position and a closed position and is biased in the open position. The shut-off valve 921 may be in series with a check valve 919. The shut-off valve 921 and/or check valve 919 may function to allow outside air in when required.

Figure 10:
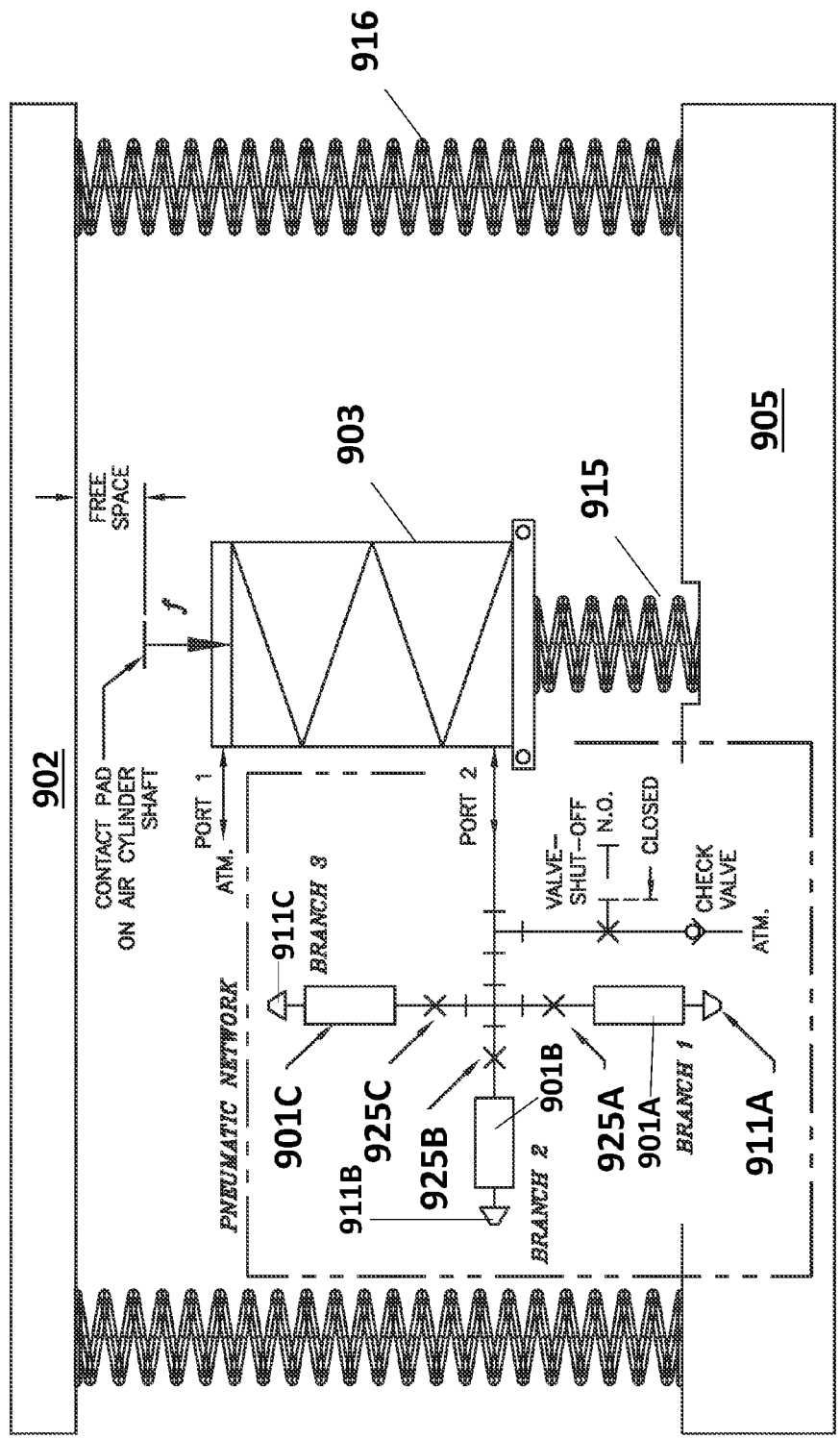
FIG. 10 is a schematic view of a heart compression simulation device of the present invention utilizing a pneumatic mechanism.
Figure 11A:
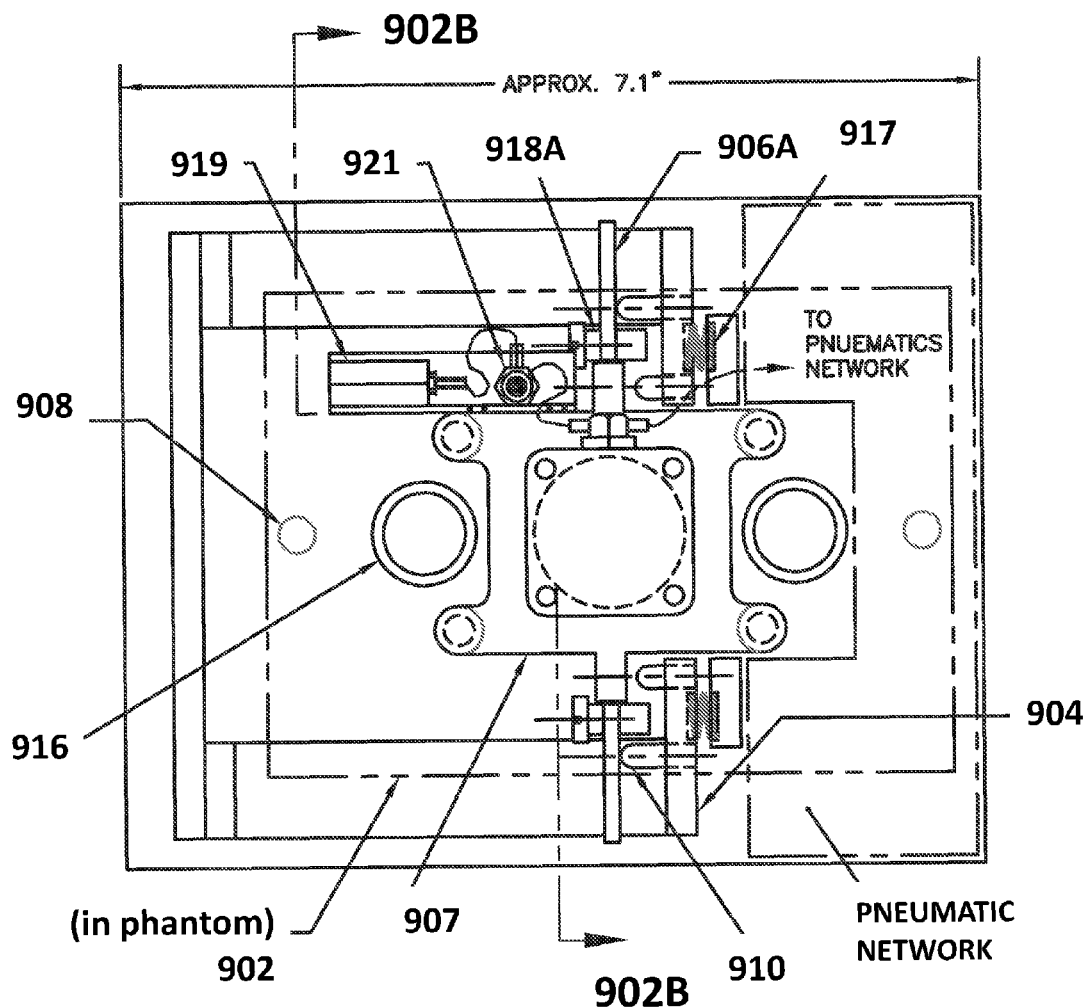
FIG. 11A is a top view of the device of the present invention (locking pins are not engaged, e.g., in the index holes).
Figure 11B:
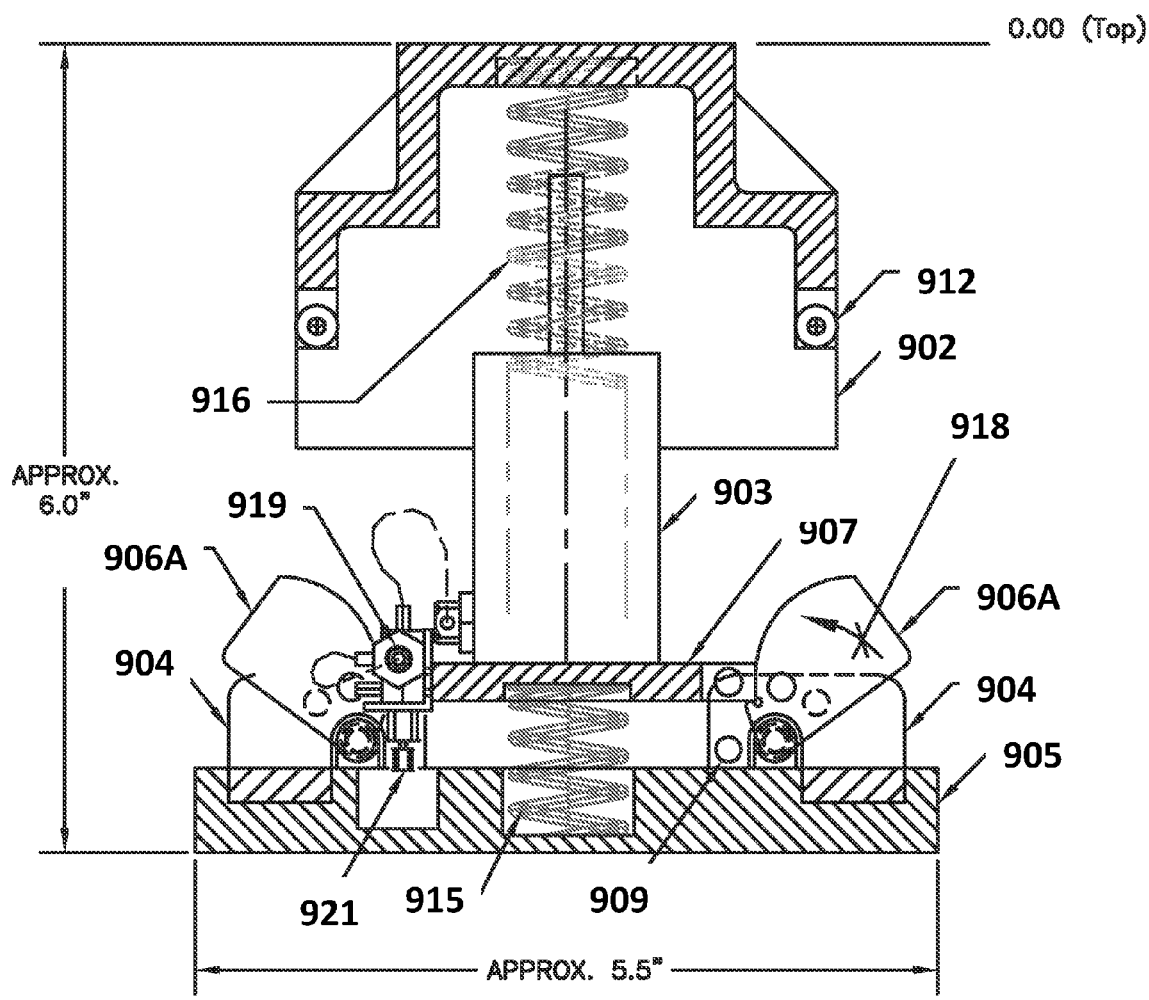
FIG. 11B is a side view of the device of FIG. 11A.
Figure 12A:
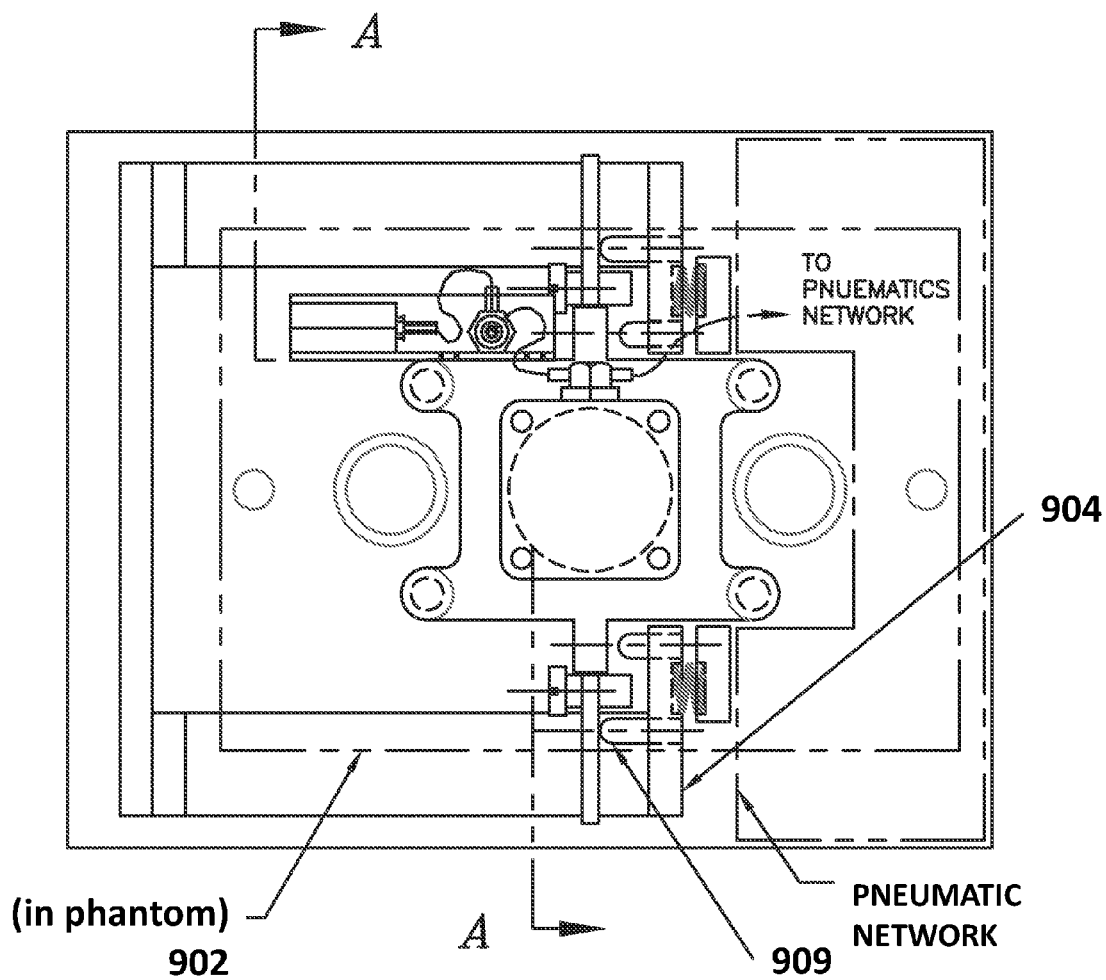
FIG. 12A is a top view of the device of the present invention (locking pins are not engaged, e.g., in the index holes).
Figure 12B:
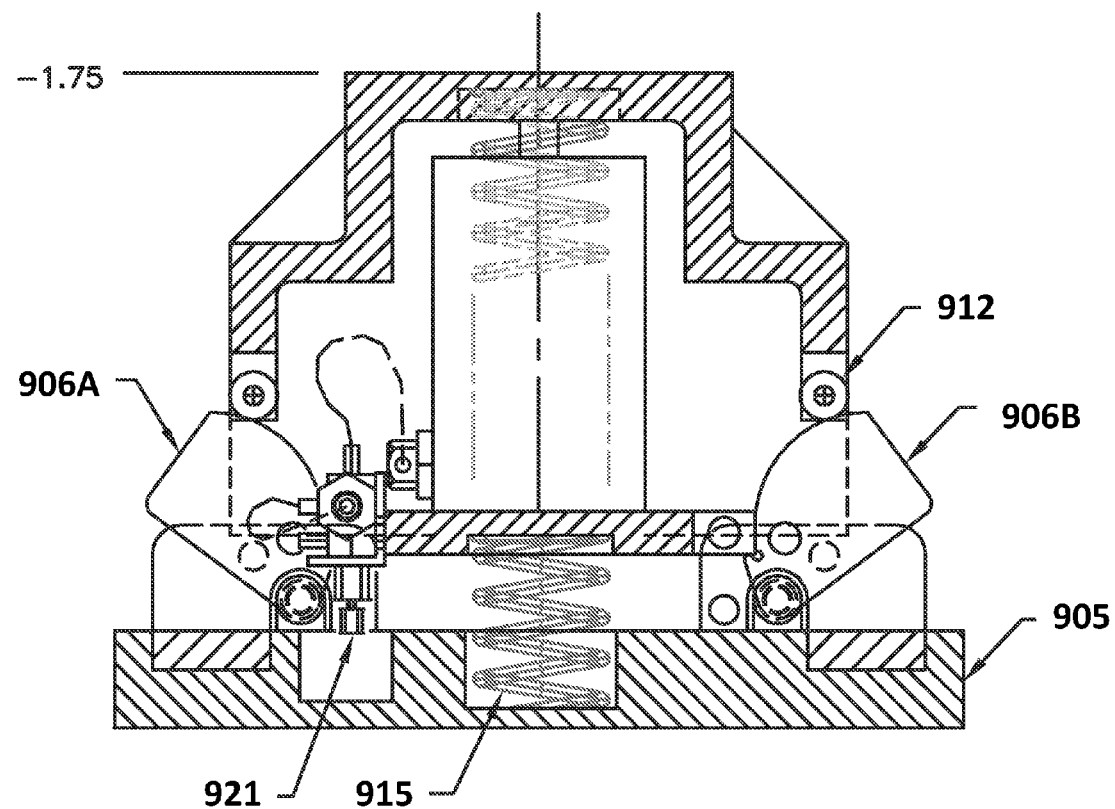
FIG. 12B is a side view of the device of FIG. 12A.
Figure 13A:
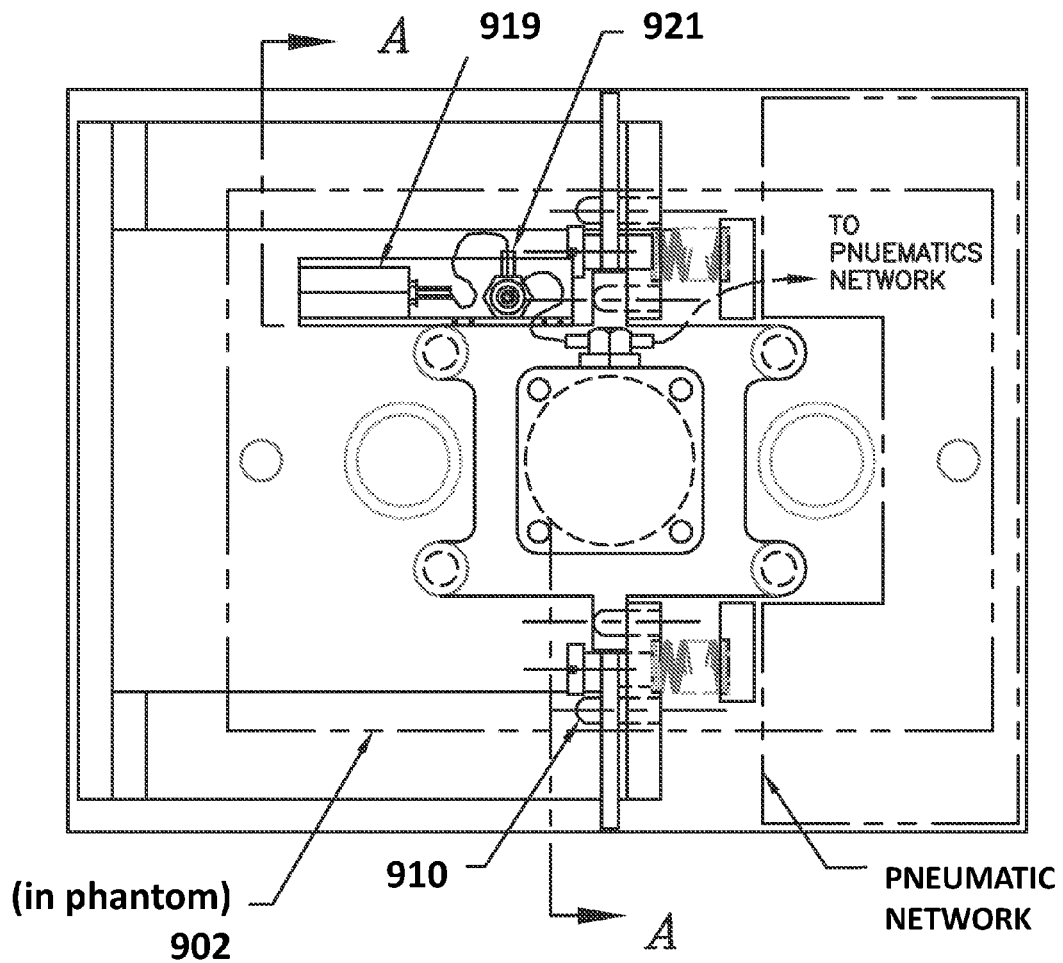
FIG. 13A is a top view of the device of the present invention (locking pins are engaged, e.g., in the index holes).
Figure 13B:
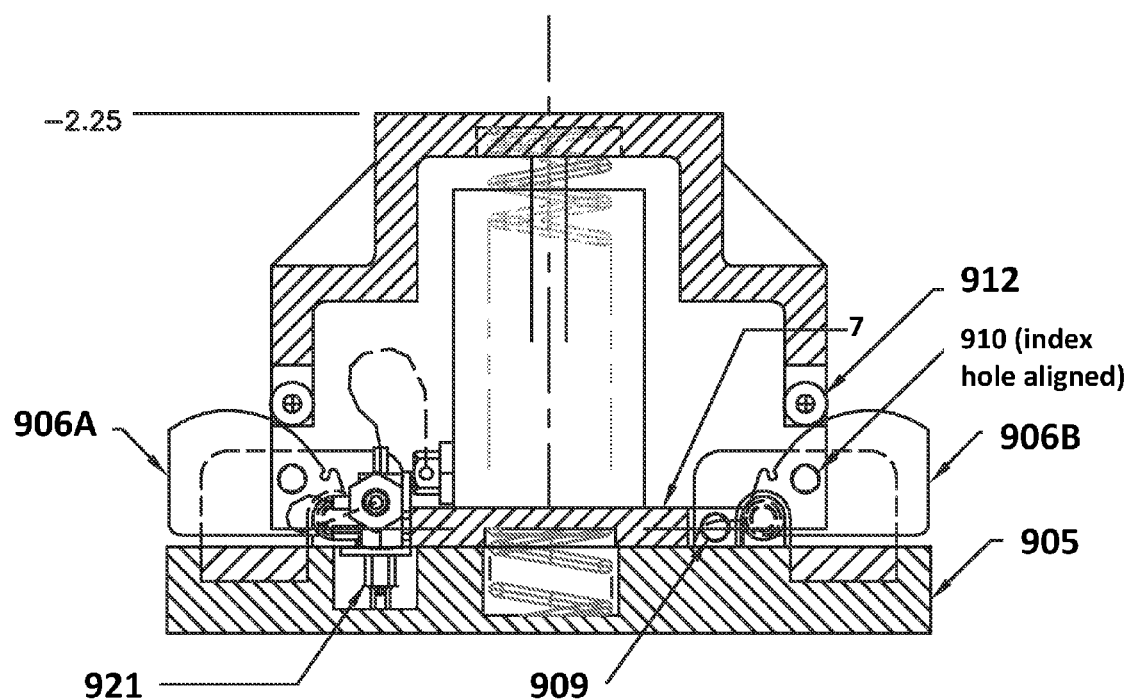
FIG. 13B is a side view of the device of FIG. 13A.
Figure 14A:
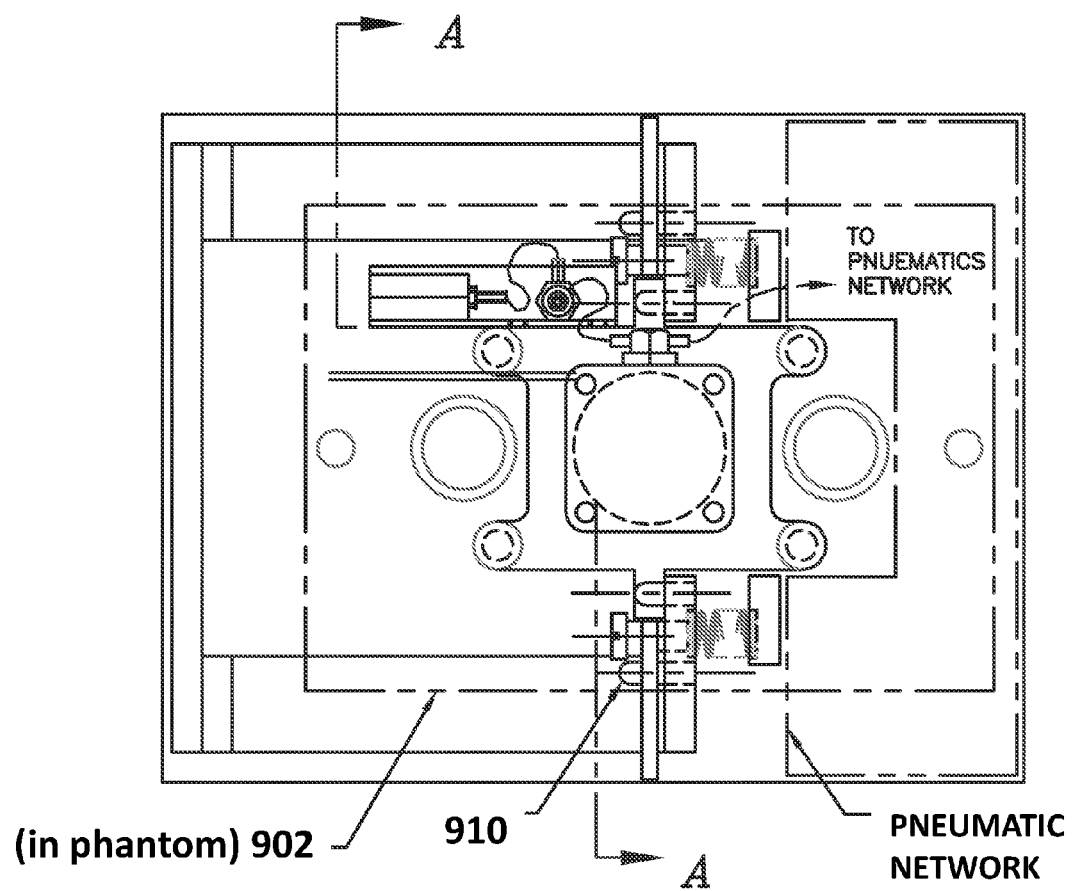
FIG. 14A is a top view of the device of the present invention (locking pins are engaged, e.g., in the index holes).
Figure 14B:
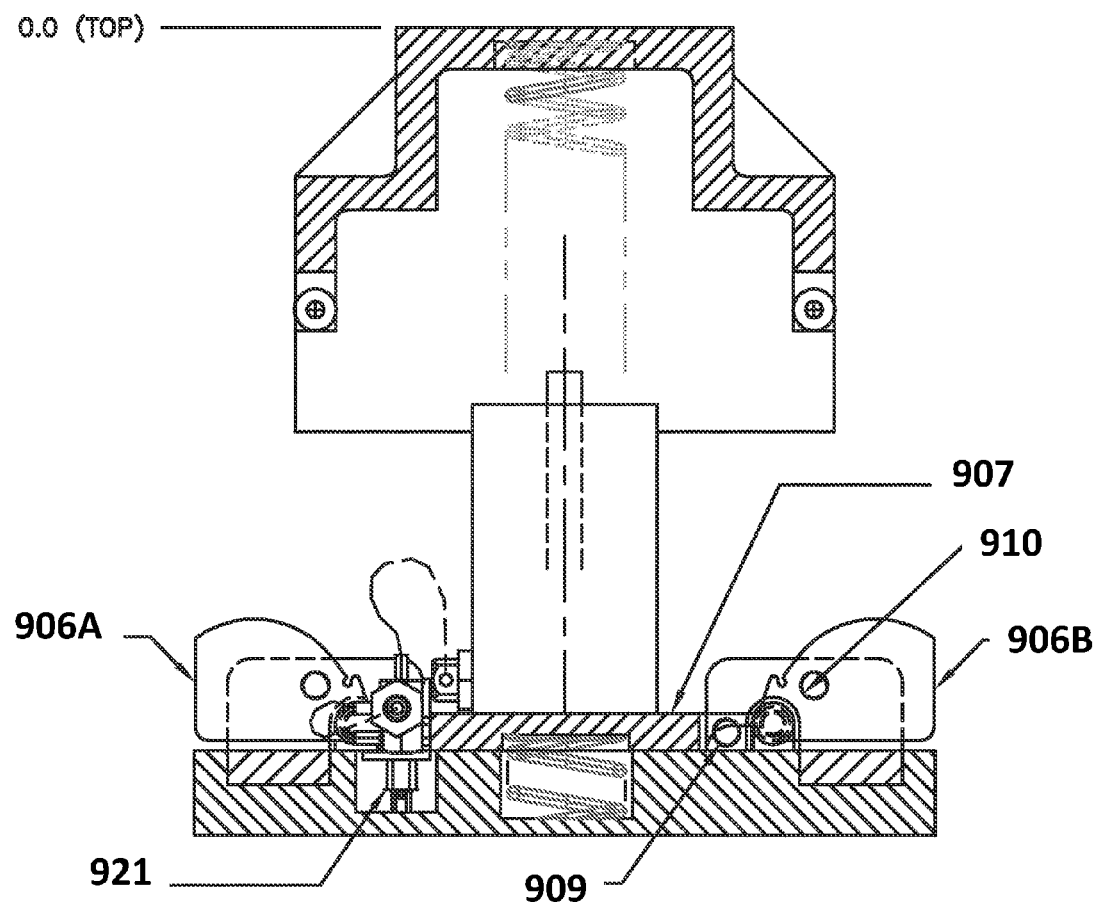
FIG. 14B is a side view of the device of FIG. 14A.

The device of the present invention may comprise a pneumatic network. A schematic representation of the pneumatic network is shown in FIG. 10. The pneumatic network is divided into a first branch, a second branch, and a third branch. The first branch of the pneumatic network comprises a first pop valve 925A, the second branch of the pneumatic network comprises a second pop valve 925B, and the third branch of the pneumatic network comprises a third pop valve 925C. Each pop valve 925 is connected (e.g., operatively connected) to an accumulator 901 (e.g., the first pop valve 925A is connected to a first accumulator 901A, the second pop valve 925B is connected to a second accumulator 901B, and the third pop valve 925C is connected to a third accumulator 901C). Each accumulator 901 is connected (e.g., operatively connected) to a restrictor 911 (e.g., the first accumulator 901A is connected to a first restrictor 911A, the second accumulator 901B is connected to a second restrictor 911B, and the third accumulator 901C is connected to a third restrictor 911C).

The pop valves 925, accumulators 901, and restrictors 911 help regulate flow within three branches of the pneumatic network. The pop valves 925 may be adjusted to release pressure at specific values. The pop valves 925 will open at a specific set pressure and will close below the specific set pressure. The accumulators 901 expand slightly on input from the exhaust of the pop valves 925. The restrictors 911 may have a time delay to the evacuation of the accumulators 901. The restrictors 911 may prevent a rapid dumping of pressure in the branch of the pneumatic network.

Figure 15A:
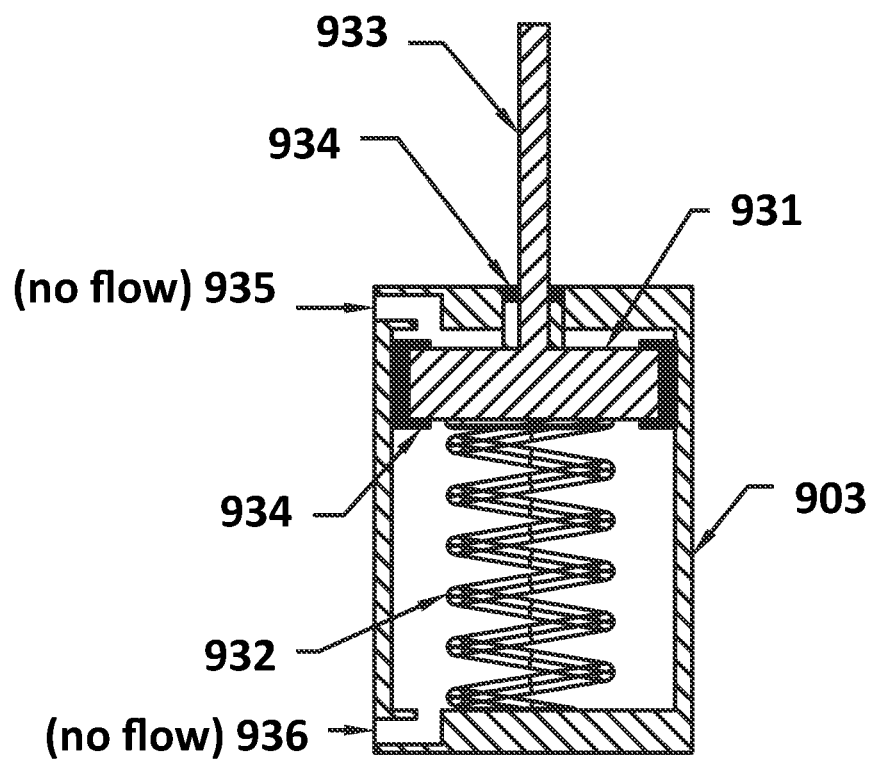
FIG. 15A-15E is a step-by-step representation of the movement of the device of the present invention utilizing a pneumatic mechanism.
Figure 15B:
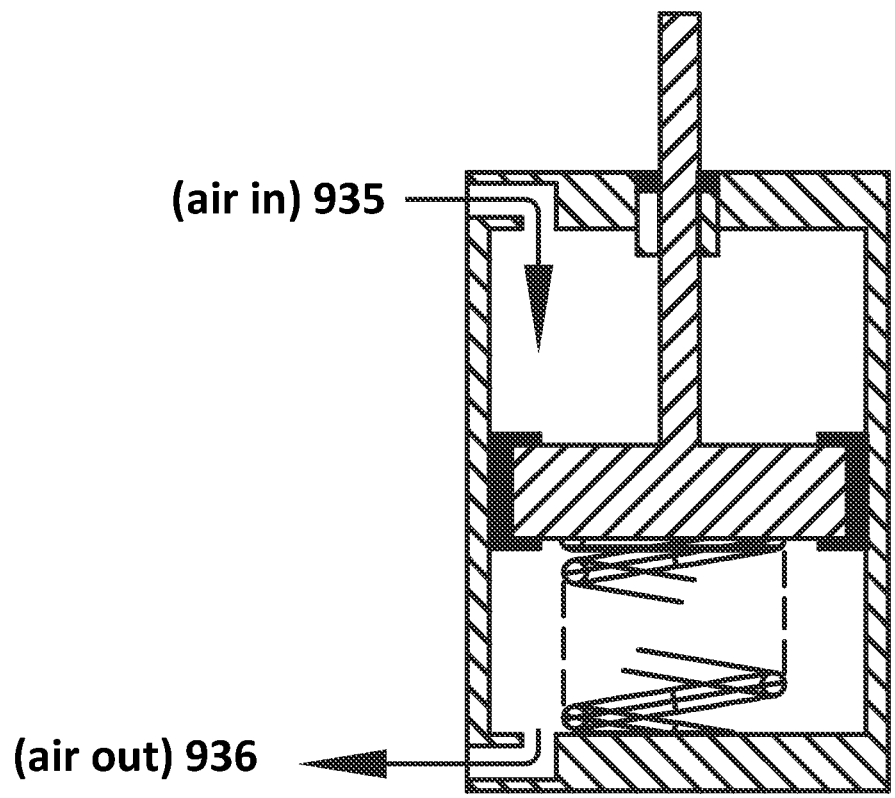
Figure 15C:
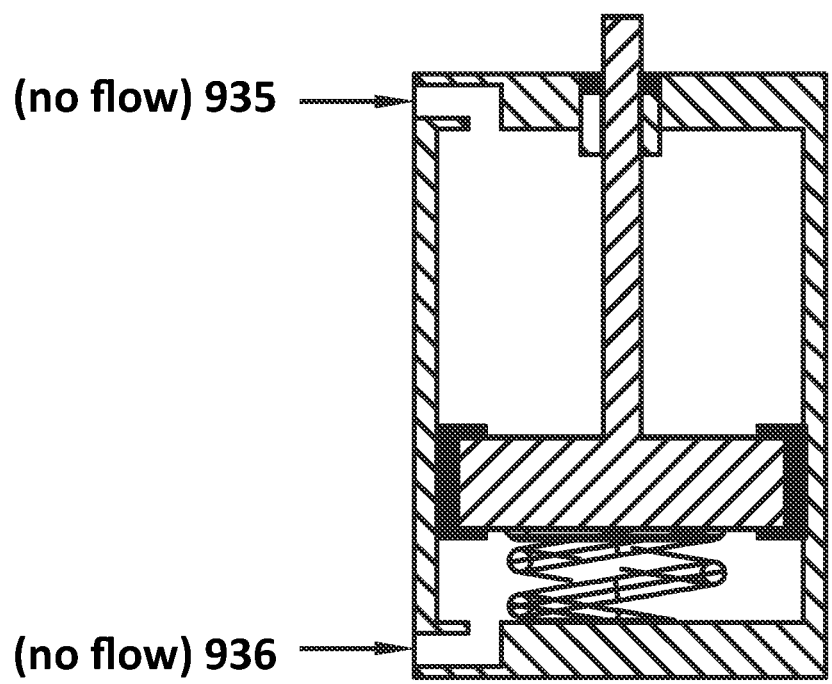
Figure 15D:
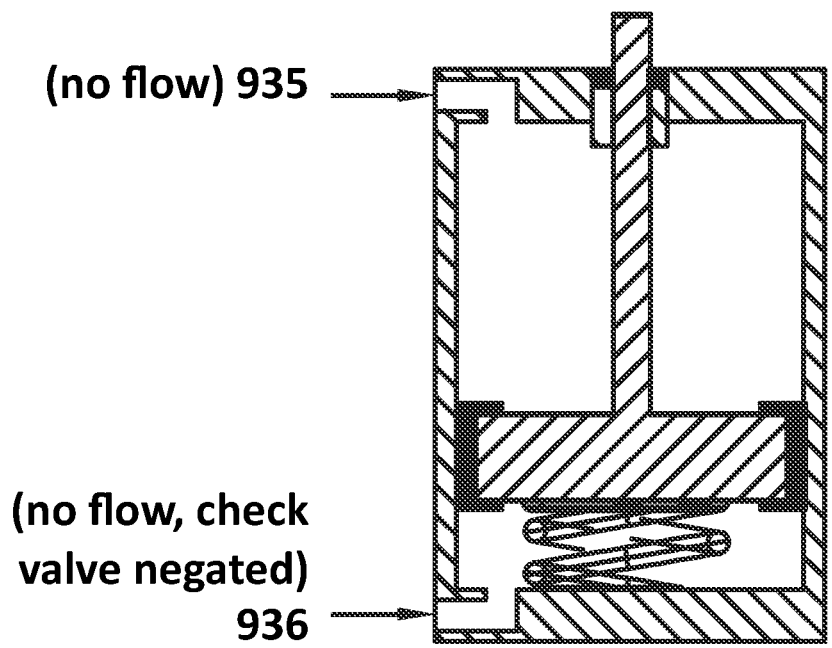
Figure 15E:
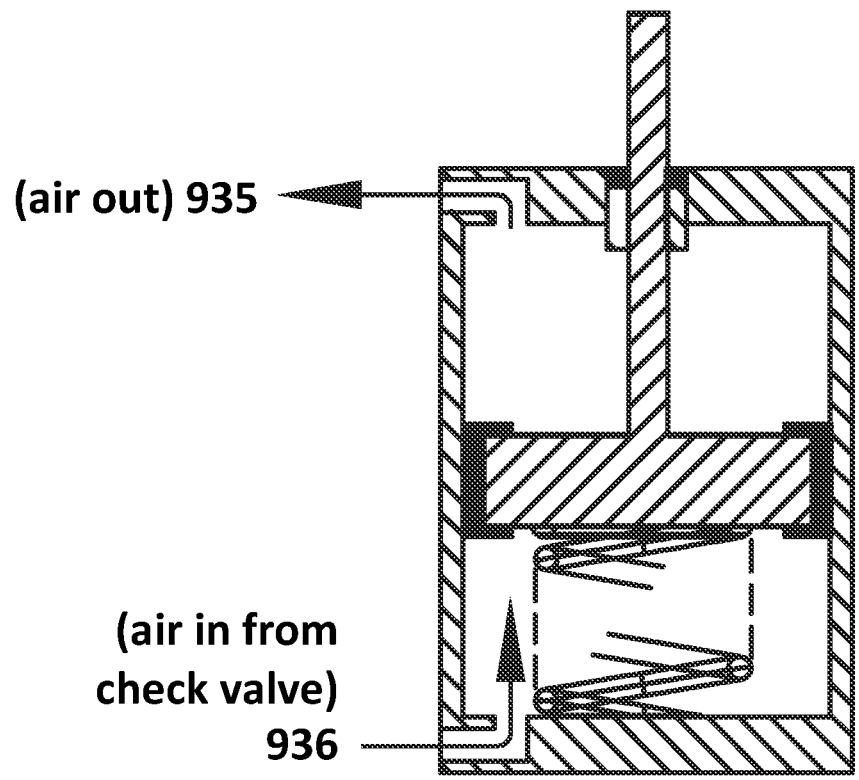
Figure 17:
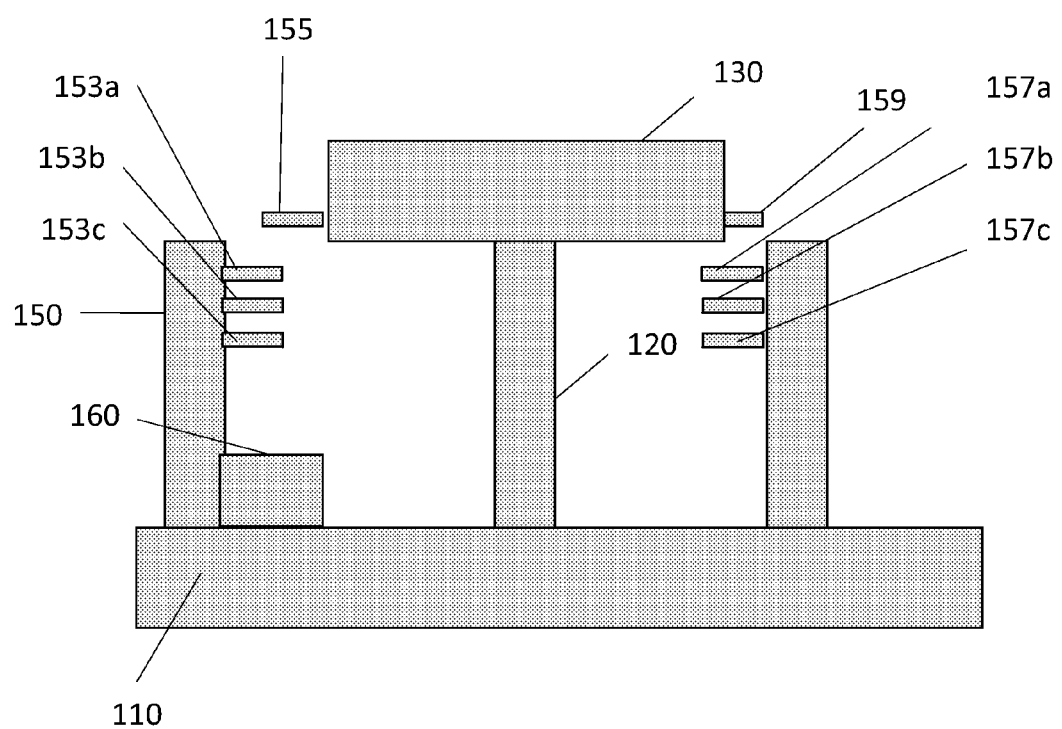
FIG. 17 is a schematic view of an alternative embodiment of the heart compression simulation device of the present invention wherein the actuator prongs 153a, 153b, 153c, 157a, 157b, 157c and the actuator prong engagement components 155, 159 are reversed.

As shown in FIG. 15A, the air cylinder 903 comprises an inner cavity. A return spring 932 and a piston 931 are disposed in the inner cavity of the air cylinder 903. The return spring 932 extends upwardly from the bottom of the air cylinder 903, and the piston 931 is positioned atop the return spring 932. The piston 931 can move between multiple positions including but not limited to a first position (e.g., up position), as shown in FIG. 15A, wherein the piston 931 is positioned at the top of the air cylinder 903 and a second position (e.g., down position), as shown in FIG. 15O, wherein the piston 931 is moved downwardly toward the bottom of the air cylinder 903. The piston 931 is biased in the first position caused by the return spring 932.

In some embodiments, a piston shaft 933 extends upwardly from the piston 931, for example through an air cylinder aperture disposed in the top end of the air cylinder 903 (e.g., see FIG. 15A). In some embodiments, a seal 934 is disposed in the air cylinder aperture (e.g., sealing contact between the air cylinder aperture and the piston shaft 933). In some embodiments, a seal 934 surrounds all or a portion of the piston 931. For example, in some embodiments, the seal 934 is sandwiched between the piston 931 and the inner wall of the inner cavity of the air cylinder 903.

A first port 935 is disposed in the air cylinder 903 at the top end (e.g., above the piston 931). The first port 935 allows passage of air from outside the air cylinder into the inner cavity of the air cylinder 903 in the portion of the inner cavity of the air cylinder 903 above the piston 931. When the piston 931 is moved towards the second position, air is drawn into the inner cavity of the air cylinder above the piston 931 (e.g., the top half of the inner cavity of the air cylinder 903) via the first port 935 (e.g., see FIG. 15B).

A second port 936 is disposed in the air cylinder 903 at the bottom end. The second port 936 allows passage of air from the inner cavity of the air cylinder below the piston 931 out of the air cylinder 903. For example, when the piston 931 is moved towards the second position, air is pushed out of the inner cavity of the air cylinder below the piston 931 (e.g., the bottom half of the inner cavity of the air cylinder 903) via the second port 936 (e.g., see FIG. 15B). When the piston 931 returns to the first position, air is drawn into the inner cavity of the air cylinder below the piston 931 (e.g., the bottom half of the inner cavity of the air cylinder 903) via the second port 936 (e.g., see FIG. 15E) and air is pushed out of the inner cavity of the air cylinder above the piston 931 (e.g., the top half of the inner cavity of the air cylinder 903) via the first port 935 (e.g., see FIG. 15E).

The device of the present invention comprises a lock-out mechanism for preventing movement of the air cylinder mount 907 and air cylinder 903 (once the air cylinder mount 907 has been moved to the top surface of the base 905). For example, a first stop lever 906A is pivotally attached to the base 905 and a second stop lever 906B is pivotally attached to the base 905. The stop levers 906 each pivot between multiple positions including but not limited to a first position (shown in FIG. 11B) and a second position (shown in FIG. 13B and FIG. 13B). The first stop lever 906A has a first notch that is positioned to engage a first side of the air cylinder mount 907 (when the first stop lever 906A is in the first position). The second stop lever 906B has a second notch that is positioned to engage a second side o the air cylinder mount 907 (when the second stop lever 906B is in the first position). When the notches engage the air cylinder mount 907, the stop levers 906 prevent movement of the air cylinder mount 907. The bottom edges (e.g., rollers 912) of the actuator 902 can contact the top of the stop levers 906 when the actuator is moved toward the compressed position (and the stop lever 906 are in the first position). When the bottom edges (e.g., rollers 912) of the actuator 902 push downwardly on the stop lever 906, the stop lever 906 pivot to the second position, moving the notches away from the air cylinder mount 907 (which allows the air cylinder mount 907 and air cylinder 903 to continue to move downwardly toward the base 905.

In some embodiments, the stop lever 906 each comprise a torsion spring 918, which biases the stop lever 906 in the first position.

The device of the present invention further comprises a reset bar 904 (e.g., spring loaded reset bar, for example a reset bar spring 917) with locking pins 909, 910 (e.g., first locking pins 910, second locking pins 909). The reset bar 904 can engage the stop lever 906 when the stop lever 906 are moved to the second position (e.g., when the actuator 902 is in the compressed position), for example the first locking pins 910 can engage first index holes in the stop lever 906 to lock the levers 906 in place (e.g., in the second position). When the stop levers 906 are in the second position (e.g., the actuator 902 is in the compressed position) and the air cylinder mount 907 is positioned at the base 905, the second locking pins 909 can engage second index holes in the air cylinder mount 907 to prevent movement (e.g., upward) of the air cylinder mount 907 and air cylinder 903. The locking pins 909, 910 may be spring-loaded.

A slot is disposed in the base 905 positioned below the shut-off valve 921 and check valve 919. When the actuator 902 is in the compressed position and the air cylinder mount 907 is positioned at the base 905, the shut-off valve 921 and check valve 919 are engaged (positioned) in the slot and the shut-off valve 921 contacts the bottom surface of the slot of the base 905 causing the shut-off valve 921 to move to the closed position. The closing of the shut-off valve 921 causes a negation of the function of the check valve 919. In some embodiments, the closing of the shut-off valve 921 causes a vacuum to result in the air cylinder 903 as the air cylinder spring 915 attempts to return the air cylinder 903 upwardly.

By manually applying positive inward pressure on the reset bar 904, the locking pins 909, 910 become disengaged and the air cylinder 903 and air cylinder mount 907 are free to move upwardly.

Sequence of Operation with Pneumatic Mechanism

Referring to FIG. 15A-E, the actuator 902 is in the starting position (at the top of travel) (e.g., "Step 1"). Downward force is applied to the actuator 902 and the actuator 902 travels downwardly until contacting the top end of the air cylinder 903 (or the top of the shaft 933 of the piston 931). With continued force applied the air cylinder 903 starts collapsing until sufficient air pressure is developed to cause the first pop valve 925A of the first branch of the pneumatic network to open and begin filling the first accumulator 901A (e.g., "Step 2"). The first accumulator 901A expands in response to the increase of pressure imposed on it, and the first restrictor 911A limits exhaust flow to the atmosphere. Continued downward force causes the second pop valve 925B (which is set to a higher threshold than the first pop valve 925A) to open and begin filling the second accumulator 901B (e.g., "Step 3").

The second accumulator 901B expands in response to the increase of pressure imposed on it, and the second restrictor 911B limits exhaust flow to the atmosphere. Continued downward force causes the third pop valve 925C (which is set to a higher threshold than the second pop valve 925B) to open and begin filling the third accumulator 901C (e.g., "Step 4"), The third accumulator 901C expands in response to the increased pressure imposed on it, and the third restrictor 911C limits exhaust flow to the atmosphere (e.g., "Step 5").

With the shaft 933 and piston 931 of the air cylinder 903 at the bottom end of the stroke, continued downward force compresses the air cylinder lift spring 915, pressing the bottom of the air cylinder 903 and air cylinder mount 907 against the stop lever 906 (e.g., "Step 6"). Continued downward force causes a plurality of events to occur. For example, the rollers 912 on the actuator 902 contact the stop lever 906, which pivot to the second position on the base 905. The stop lever 906 prevent the air cylinder 903 from further downward motion until the stop lever 906 (notches) are pivoted out of contact with the mount air cylinder 907 by the actuator 902 (e.g., rollers 912). With the stop lever 906 pivoted out of engagement with the air mount cylinder 907, the air cylinder 903 travels further downwardly until the air cylinder 903 reaches its bottom of travel, e.g., the top surface of the base 905 (the actuator 902 being in the compressed position). The first locking pins 910 of the reset bar 904 engage the first index holes in the stop lever 906 to lock the stop lever 906 in the second position. Simultaneously, as the stop lever 906 are locked, the second locking pins 909 of the reset bar 904 engage the second index holes in the air cylinder mount 907 and lock the air cylinder 903 and air cylinder mount 907 out of motion. Simultaneously, the shut-off valve 921 makes contact with the slot of the base 905, thereby closing the shut-off valve 921. The closing of the valve causes a negation of the check valve's function and causes a vacuum to result in the air cylinder 903 as the air cylinder spring 915 attempts to return the air cylinder 903 upwardly (e.g., "Step 7").

Upon removal of downward force on the actuator 902, the actuator 902 will return to its top of stroke (the starting position) and repetitive pumping of the actuator 902 may commence (e.g., "Step 8"). Upon completion of the pumping routine the device may be returned to "Step 1" status by manually applying positive inward pressure on the reset bar 904, which will cause the locking pins 909, 910 to become disengaged from the respective index holes, freeing the air cylinder 903 and associated components (e.g., "Step 9").

In some embodiments, when the pop valves 925 are opened, a sensation (and optionally a sound) is produced. The sensation is designed to simulate the tearing of costal cartilages, for example as it might sound when one is performing compressions in a real emergency situation The sound may include but is not limited to a cracking or popping sound.

In some embodiments, the device is configured such that the opening of the first pop valve 925A occurs when the actuator 902 is pushed downwardly about 1.25 inches. In some embodiments, the device is configured such that opening of the second pop valve 925B occurs when the actuator 902 is pushed downwardly about 1.5 inches. In some embodiments, the device is configured such that opening of the third pop valve 925C occurs when the actuator 902 is pushed downwardly about 1.75 inches.

The present invention is not limited to the aforementioned configurations and components (e.g., actuator prongs, detents, compression springs, etc.). For example, other designs may be considered that achieve the features of the present invention such has simulation of resistance and sounds (e.g., rib cracking). Other examples of designs include but are not limited to detent or leaf spring mechanisms that release upon appropriate downward force (e.g., spring-loaded, over-center, mechanical, and/or the like.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

The following are additional disclosures of the present invention:

1. A method of simulating chest compressions, said method comprising:
(a) obtaining a simulation device comprising:
  a base 110;
  (ii) a resistance means 120 disposed on the base 110;
  (iii) an actuator 130 operatively connected to the resistance means 120, the actuator 130 can move between at least a starting position wherein the actuator 130 is positioned above the base 110 and an end position wherein the actuator 130 is pushed down near or contacting the base 110, the actuator 130 is biased in the starting position caused by the resistance means 120;
  (iv) a tear effect providing mechanism 150, the tear effect providing mechanism 150 provides resistance when moving the actuator 130 from the starting position to the end position a first time; and
  (v) a lock-out mechanism 160 adapted to disengage the tear effect providing mechanism 150 after the actuator 130 has been moved from the starting position to the end position the first time such that subsequent movements of the actuator 130 between the starting position and the end position are not hindered by the tear effect providing mechanism 150; and
(b) moving the actuator 130 from the starting position to the end position, the tear effect providing mechanism 150 providing resistance to cause a sensation of tearing costal cartilages, the lock-out mechanism 160 functioning to disengage the tear effect providing mechanism 150 when the actuator 130 is in the end position.

2. The method of claim 1 further comprising allowing the actuator 130 to move back from the end position to the first position and moving the actuator 130 at least one more time to the end position.

3. The method of claim 1, wherein the resistance means 120 comprises a spring mechanism, a pneumatic mechanism, a dampener mechanism, or a hydraulic mechanism.

4. The method of claim 1, wherein the tear effect providing mechanism 150 comprises a first actuator prong engagement component 154 adapted to engage a first set of actuator prongs 152 disposed on the actuator 130, the first actuator prong engagement component 154 is adapted to engage the first set of actuator prongs 152 when the actuator 130 is moved from the starting position to the end position.

5. The method of claim 4, wherein the first actuator prong engagement component 154 comprises a detent or a leaf spring.

6. The device of claim 1, wherein the tear effect providing mechanism 150 comprises a detent mechanism, a leaf spring mechanism, or a pneumatic mechanism.

7. The method of claim 4 further comprising a first pedestal 17A disposed atop the base 110, wherein the first set of actuator prongs 152 is disposed on the actuator 130 faces the first pedestal 17A and the first actuator prong engagement component 154 is disposed on the first pedestal 17A, the first actuator prong engagement component 154 engages the first set of actuator prongs 152 to provide resistance when moving the actuator 130 from the starting position to the end position the first time.

8. The method of claim 4, wherein the lock-out mechanism 160 is adapted to move the first actuator prong engagement component 154 away from the first set of actuator prongs 152.

The method of claim 4, wherein the first set of actuator prongs 152 comprises a first actuator prong 152a, a second actuator prong 152b, and a third actuator prong 152c.

10. The method of claim 9, wherein when the actuator 130 is pushed downwardly about 1.25 inches from the starting position the first actuator prong engagement component 154 engages the first actuator prong 152a, when the actuator 130 is pushed downwardly about 1.5 inches from the starting position the first actuator prong engagement component 154 engages the second actuator prong 152b, and when the actuator 130 is pushed downwardly about 1.75 inches from the starting position the first actuator prong engagement component 154 engages the third actuator prong 152c.

10. The method of claim 1 further comprising a reset mechanism 170 functioning to re-engage the tear effect providing mechanism 150 such that the tear effect providing mechanism 150 again provides resistance when moving the actuator 130 from the starting position to the end position.

Further disclosures of the present invention are:

1. A heart compression simulation device comprising
(a) an actuator 130, the actuator 130 can move between a starting position and an end position;
(b) a resistance means 120 coupled to the actuator 130, the resistance means 120 biases the actuator 130 in the starting position;
(c) a tear effect providing mechanism 150, the tear effect providing mechanism 150 provides resistance when the actuator 130 is moved from the starting position to the end position a first time; and
(d) a lock-out mechanism 160 adapted to disengage the tear effect providing mechanism 150 after the actuator 130 has been moved from the starting position to the end position the first time such that subsequent movements of the actuator 130 between the starting position and the end position are not hindered by the tear effect providing mechanism 150.

2. The device of claim 1, wherein the wherein the tear effect providing mechanism 150 provides a sensation of tearing costal cartilages.

3. The device of claim 1, wherein when the actuator 130 is pushed downwardly about 1.25 inches from the starting position the tear effect providing mechanism 150 provides a first resistance, when the actuator 130 is pushed downwardly about 1.5 inches from the starting position the tear effect providing mechanism 150 provides a second resistance, and when the actuator 130 is pushed downwardly about 1.75 inches from the starting position the tear effect providing mechanism 150 provides a third resistance.

4. The device of claim 1 further comprising a reset mechanism 170 functioning to re-engage the tear effect providing mechanism 150 such that the tear effect providing mechanism 150 again provides resistance when moving the actuator 130 from the starting position to the end position.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A heart compression simulation device comprising:
(a) a base (110);
(b) a resistance means (120) disposed on the base (110);
(c) an actuator (130) operatively connected to the resistance means (120), the actuator (130) can move between at least a starting position wherein the actuator (130) is positioned above the base (110) and an end position wherein the actuator (130) is pushed down near or contacting the base (110), the actuator (130) is biased in the starting position caused by the resistance means (120);
(d) a tear effect providing mechanism (150), the tear effect providing mechanism (150) provides resistance when moving the actuator (130) from the starting position to the end position a first time; and
(e) a lock-out mechanism (160) adapted to disengage the tear effect providing mechanism (150) after the actuator (130) has been moved from the starting position to the end position the first time such that subsequent movements of the actuator (130) between the starting position and the end position are not hindered by the tear effect providing mechanism (150).

2. The device of claim 1, wherein the resistance means (120) comprises a spring mechanism, a pneumatic mechanism, a dampener mechanism, or a hydraulic mechanism.

3. The device of claim 1, wherein the wherein the tear effect providing mechanism (150) provides a sensation of tearing costal cartilages.

4. The device of claim 1, wherein the tear effect providing mechanism (150) comprises a first actuator prong engagement component (154) that engages a first set of actuator prongs (152) disposed on the actuator (130), the first actuator prong engagement component (154) is adapted to engage the first set of actuator prongs (152) when the actuator (130) is moved from the starting position to the end position.

5. The device of claim 4, wherein the first actuator prong engagement component (154) comprises a detent or a leaf spring.

6. The device of claim 1, wherein the tear effect providing mechanism (150) comprises a detent mechanism, a leaf spring mechanism, or a pneumatic mechanism.

7. The device of claim 4 further comprising a first pedestal (17A) disposed atop the base (110), wherein the first set of actuator prongs (152) is disposed on the actuator (130) facing the first pedestal (17A) and the first actuator prong engagement component (154) is disposed on the first pedestal (17A) the first actuator prong engagement component (154) engages the first set of actuator prongs (152) to provide resistance when moving the actuator (130) from the starting position to the end position the first time.

8. The device of claim 7, wherein the tear effect providing mechanism further comprises a second actuator prong engagement component (158) adapted to engage a second set of actuator prongs (156) disposed on the actuator (130) the second actuator prong engagement component (158) is adapted to engage the second set of actuator prongs (156) when the actuator (130) is moved from the starting position to the end position.

9. The device of claim 8, wherein the second actuator prong engagement component (158) comprises a detent or a leaf spring.

10. The device of claim 8 further comprising a second pedestal (17B) disposed atop the base, the first pedestal (17A) and second pedestal (17B) are positioned opposite each other and outside of the actuator (130), a second set of actuator prongs (156) is disposed on the actuator (130) facing the second pedestal (17B) and a second actuator prong engagement component (158) is disposed on the second pedestal (17B), the second actuator prong engagement component (158) engages the second set of actuator prongs (156) to provide resistance when moving the actuator (130) from the starting position to the end position the first time.

11. The device of claim 4, wherein the lock-out mechanism (160) is adapted to move the first actuator prong engagement (154) component away from the first set of actuator prongs (152).

12. The device of claim 4, wherein the first set of actuator prongs (152) comprises a first actuator prong (152a), a second actuator prong (152b), and a third actuator prong (152c).

13. The device of claim 8, wherein the second set of actuator prongs (156) comprises a first actuator prong (156a) a second actuator prong (156b), and a third actuator prong (156c).

14. The device of claim 12, wherein when the actuator (130) is pushed downwardly about 1.25 inches from the starting position the first actuator prong engagement component (154) engages the first actuator prong (152a) when the actuator (130) is pushed downwardly about 1.5 inches from the starting position the first actuator prong engagement component (154) engages the second actuator prong (152b), and when the actuator (130), is pushed downwardly about 1.75 inches from the starting position the first actuator prong engagement component (154) engages the third actuator prong (152c).

15. The device of claim 1 further comprising a reset mechanism (170) functioning to re-engage the tear effect providing mechanism (150) such that the tear effect providing mechanism (150) again provides resistance when moving the actuator (130) from the starting position to the end position.

16. A heart compression simulation device comprising:
(a) a base (16);
(b) a spring (10) extending upwardly from the base (16);

(c) an actuator (2) disposed atop the spring (10), the actuator (2) and base (16) together sandwich the spring (10), wherein the actuator (2) can move between a starting position wherein the actuator (2) is positioned above the base (16) and an end position wherein the actuator (2) is pushed down near or contacting the base (16), the actuator (2) is biased in the starting position caused by the spring (10);

(d) a first pedestal (17A) and a second pedestal (17B) each disposed atop the base (16), the pedestals (17) are positioned opposite each other and outside of the actuator (2);

(e) a first set of actuator prongs (22A) disposed on the actuator (2) facing the first pedestal (17A) and a second set of actuator prongs (22B) disposed on the actuator (2) facing the second pedestal (17B);

(f) a first hub (47A) pivotally attached to the first pedestal (17A) and a second huh (47B) pivotally attached to the second pedestal (17B);

(g) a first detent (21A) disposed on the first hub (47A) and positioned below the first set of actuator prongs (22A) and a second detent (21B) disposed on the second hub (47B) and positioned below the second set of actuator prongs (22B), the detents (21) are adapted to engage the respective sets of actuator prongs (22) when the actuator (2) is moved to the end position, the detents (21) provide resistance when the actuator (2) is moved to the end position, wherein when the actuator (2) is moved to the end position and the detents (21) engage the respective sets of actuator prongs (22) a sensation is produced;

wherein the hubs (47) can each pivot between a disengaged position wherein the hubs (47) are positioned to allow the detents (21) to engage the respective sets of actuator prongs (22) and an engaged position wherein the hubs (47) are positioned to keep the detents (21) out of range of the respective actuator prongs (22); and (h) a lock-out mechanism configured to pivot the hubs (47) from the disengaged position to the engaged position and secure the hubs (47) in the engaged position thereby keeping the detents (21) out of range of the respective actuator prongs (22), the lock-out mechanism is activated when the actuator (2) is moved to the end position.

17. The device of claim 16 further comprising a guide pin (23) disposed between the base (16) and the actuator (2).

18. The device of claim 16, wherein the first set of actuator prongs (22A) comprises a first actuator prong, a second actuator prong, and a third actuator prong and the second set of actuator prongs (22B) comprises a first actuator prong, a second actuator prong, and a third actuator prong.

19. The device of claim 18, wherein when the actuator (2) is pushed downwardly about 1.25 inches from the starting position the detents (21) each engage the respective first actuator prong, when the actuator (2) is pushed downwardly about 1.5 inches from the starting position the detents (21) each engage the respective second actuator prong, and when the actuator (2) is pushed downwardly about 1.75 inches from the starting position the detents (21) each engage the respective third actuator prong.

20. The device of claim 16, wherein the first hub (47A) is pivotally attached to the first pedestal (17A) via a first torsion spring (19A), and the second hub (47B) is pivotally attached to the second pedestal (17B) via a second torsion spring (19B).

21. The device of claim 16, wherein the first detent (21A) is attached to the first hub (47A), and the second detent (21B) is attached to the second hub (47B).

22. The device of claim 16, wherein the lock-out mechanism comprises:

(a) a first crank (24A) pivotally attached to the first pedestal (17A) near the base (16), the first crank (24A) having a first end positioned adjacent to the first hub (47A) and a second end extending underneath the actuator (2), the first crank (24A) can pivot between an up position wherein the second end is positioned a distance above the base (16) and a down position wherein the second end is moved downwardly to the base (16) wherein moving the first crank (24A) to the down position causes the first huh (47A) to pivot to the engaged position;

(b) a second crank (24B) pivotally attached to the second pedestal (17B) near the base (16), the second crank (24B) having a first end positioned adjacent to the second hub (47B) and a second end extending underneath the actuator (2), the second crank (24B) can pivot between an up position wherein the second end is positioned a distance above the base (16) and a down position wherein the second end is moved downwardly to the base (16), wherein moving the second crank (24B) to the down position causes the second hub (47B) to pivot to the engaged position;

(c) a first pin-hub lock (20A) extending toward the first hub (47A), the first pin-hub lock (20A) can move between a locked position wherein the first pin-hub lock (20A) engages a first index hole (48) disposed in the first hub (47A) and an unlocked position wherein the first pin-hub lock (20A) is free from the first index hole (48); and (d) a second pin-hub lock (20B) extending toward the second hub (47B), the second pin-hub lock (20B) can move between a locked position wherein the second pin-hub lock (20B) engages a second index hole (48) disposed in the second hub (47B) and an unlocked position wherein the second pin-hub lock (20B) is free from the second index hole (48);

wherein when the cranks (24) are moved to the down position the cranks (24) pivot the hubs (47) to the engaged position and the pin-hub locks (20) move to the locked position to secure the hubs (47) in the engaged position.

23. The device of claim 16 further comprising a reset bar (25) functioning to move the hubs (47) back to the disengaged position from the engaged position.

24. The device of claim 16 further comprising an actuator decel suspension (50) disposed the actuator (2), the actuator decel suspension (50) functions to provide increased resistance when the actuator (2) moves to the end position.

25. The device of claim 16, wherein the first detent (21A) and the second detent (21B) each comprise a detent housing (96) with a sliding tongue (86), the sliding tongues (86) are each biased in an extended direction in the direction of the actuator (2) via a detent spring (87).

26. A detent mechanism device comprising:

(a) a base (16);

(b) a spring (10) extending upwardly from the base (16);

(c) an actuator (2) disposed atop the spring (10), the actuator (2) and base (16) together sandwich the spring (10), wherein the actuator (2) can move between a starting position wherein the actuator (2) is positioned above the base (16) and an end position wherein the actuator (2) is pushed down near or contacting the base (16), the actuator (2) is biased in the starting position caused by the spring (10);

(d) a first pedestal(17A) disposed atop the base (16) in proximity to the actuator (2);

(e) a first set of actuator prongs (22A) disposed on the actuator (2) facing the first pedestal (17A); and (f) a first detent (21A) disposed on the first pedestal (17A) and positioned below the first set of actuator prongs (22A), the first detent (21A) is adapted to engage the first set of actuator prongs (22A) when the actuator (2) is moved to the end. position, the first detent (21A) provides resistance when the actuator (2) is moved to the end position, wherein when the actuator (2) is moved to the end position and the first detent (21A) engages the first set of actuator prongs (22A) a sensation is produced.

27. The detent mechanism device of claim 26 further comprising a second pedestal (17B) disposed atop the base (16), the second pedestal (17B) is positioned opposite the first pedestal (17A), the pedestals (17) are positioned outside of the actuator (2); a second set of actuator prongs (22B) disposed on the actuator (2) facing the second pedestal (17B); and a second detent (21B) disposed on the second pedestal (17B) and positioned below the second set of actuator prongs (22B) the second detent (21B) is adapted to engage the second set of actuator prongs (22B) when the actuator (2) is moved to the end position, the second detent (21B) provides resistance when the actuator (2)is moved to the end position, wherein when the actuator (2) is moved to the end position and the second detent engages the second set of actuator prongs (22B), a sensation is produced.

28. The detent mechanism device of claim 26, wherein the first detent (21A) comprises a first detent housing (96A) with a first sliding tongue (86A) the first sliding tongue (86A) is biased in an extended direction in the direction of the actuator (2) via a first detent spring (87A).

29. The detent mechanism device of claim 27, wherein the second detent (21B) comprises a second detent housing (96B) with a second sliding tongue (86B), the second sliding tongue (86B) is biased in an extended direction in the direction of the actuator (2) via a second detent spring (87B).

\* \* \* \* \*